US011553244B2

(12) United States Patent
Maricevic et al.

(10) Patent No.: US 11,553,244 B2
(45) Date of Patent: Jan. 10, 2023

(54) DOWNSTREAM PLANT CAPACITY

(71) Applicant: ARRIS Enterprises LLC, Suwanee, GA (US)

(72) Inventors: Zoran Maricevic, West Hartford, CT (US); Marcel Franz Christian Schemmann, Maria Hoop (NL); John O. Caezza, Farmington, CT (US); Eric Joseph Cormier, Bristol, CT (US); Zhijian Sun, Avon, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 46 days.

(21) Appl. No.: 17/214,543

(22) Filed: Mar. 26, 2021

(65) Prior Publication Data

US 2022/0053235 A1 Feb. 17, 2022

Related U.S. Application Data

(60) Provisional application No. 63/065,693, filed on Aug. 14, 2020, provisional application No. 63/065,680, filed on Aug. 14, 2020, provisional application No. 63/065,677, filed on Aug. 14, 2020.

(51) Int. Cl.
*H04N 21/438* (2011.01)
*H04N 21/61* (2011.01)
*H04N 21/437* (2011.01)

(52) U.S. Cl.
CPC ....... *H04N 21/4383* (2013.01); *H04N 21/437* (2013.01); *H04N 21/6118* (2013.01)

(58) Field of Classification Search
CPC ............ H04L 12/2801; H04L 12/2861; H04N 21/437; H04N 21/4383; H04N 21/6118; H04Q 11/0062
See application file for complete search history.

(56) References Cited

U.S. PATENT DOCUMENTS

2011/0255452 A1* 10/2011 Brooks ............... H04L 12/2801
370/297
2013/0125194 A1* 5/2013 Finkelstein ........ H04N 21/6118
725/129

* cited by examiner

*Primary Examiner* — Rong Le
(74) *Attorney, Agent, or Firm* — Chernoff, Vilhauer, McClung & Stenzel, LLP

(57) ABSTRACT

An amplification system for amplifying a service of a cable television network that includes a first amplifier receiving the service and providing a first output signal having a first frequency band with a first maximum downstream frequency to a first customer and a second amplifier. The amplification system includes the second amplifier receiving the first output signal and providing a second output signal having a second frequency band with a second maximum downstream frequency to a second customer, wherein the second maximum downstream frequency is less than the first maximum downstream frequency.

18 Claims, 28 Drawing Sheets

DOWNSTREAM PLANT CAPACITY

CROSS-REFERENCE TO RELATED APPLICATIONS

This application claims the benefit of U.S. Patent Application Ser. No. 63/065,677 filed Aug. 14, 2020; claims the benefit of U.S. Patent Application Ser. No. 63/065,680 filed Aug. 14, 2020; and claims the benefit of U.S. Patent Application Ser. No. 63/065,693 filed Aug. 14, 2020.

BACKGROUND OF THE INVENTION

The present invention relates to cable systems.

A cable-based system can be used to deliver high-definition digital entertainment and telecommunications such as video, voice, and high-speed Internet services from a headend to subscribers over an existing cable television network. The cable television network can take the form of an all-coax, all-fiber, hybrid fiber/coax (HFC) network, or otherwise.

Generally, analog video signals and digital bit streams representing various services (e.g., video, voice, and Internet) from various digital information sources are received at the headend and converted to radio frequency (RF) optically modulated signals for transmission over the cable network. One or more services output from the headend can occupy a specific 6 MHz-wide RF channel having a center frequency that typically falls within a frequency range having a lower limit of generally 50 MHz and an upper limit of generally 1002 MHz.

For digital bit streams, in some implementations, each of the digital bit streams is encoded to produce a corresponding digital QAM symbol stream. Each digital QAM symbol stream is root-Nyquist filtered, converted to an analog QAM symbol stream, and QAM modulated onto an RF carrier signal having a frequency that corresponds to a center frequency of a 6 MHz-wide RF channel. For digital broadcast services (e.g., service that are intended for all subscribers in a serving area) such as video, the RF carrier signal frequency typically falls within a frequency range having a lower limit of 550 MHz and an upper limit of 750 MHz. For digital narrowcast services (e.g., services that are intended for a single customer in a serving area) such as video on demand, internet data, and telephony, for example, the RF carrier signal frequency can vary from system to system. Broadcast analog video signals received at the headend are modulated onto an RF carrier signal having a frequency that typically falls within a frequency range having a lower limit of 50 MHz and an upper limit of 550 MHz.

Some or all of the analog single-channel modulated RF carrier signals can be combined to produce an analog multi-channel RF signal. One or more analog optical transmitters convert the analog single-channel modulated RF carrier signals and/or multi-channel RF signals to optically modulated signals.

Generally, the RF optically modulated signals are transmitted from the headend via one or more fibers to one or more fiber nodes. Each of the fiber nodes includes an optical receiver that converts the received optically modulated signals representing broadcast and narrowcast services to electrical RF signals. The electrical RF signals then are transmitted to receiving devices such as cable modems (CMs) and/or settop boxes (STBs) that are served by the fiber node. All of the receiving devices served by the fiber node can receive the electrical RF signals. If the electrical RF signal represents a broadcast service, each receiving device served by the fiber node can process and deliver the corresponding service to the subscriber. If the electrical signal represents a narrowcast service, the receiving device to which the electrical signal is addressed can process and deliver the corresponding service to the subscriber.

In a so-called overlay system, an analog broadcast optical transmitter transmits broadcast RF optically modulated signals on a first fiber. For narrowcast services, for each fiber node there can exist an analog narrowcast optical transmitter in the headend to output narrowcast RF optically modulated signals at a particular wavelength designated for the fiber node. The narrowcast RF optically modulated signals output by an analog narrowcast optical transmitter can comprise one or more RF channels. A multiplexer combines the narrowcast RF optically modulated signals produced by the narrowcast optical transmitters to produce a multi-wavelength RF optically modulated signal on a second fiber. The broadcast RF optically modulated signal transmitted on the first fiber and the multi-wavelength RF optically modulated signal transmitted on the second fiber can be received at an optical transition node ("OTN"). At the OTN, the narrowcast signals are demultiplexed by an optical demultiplexer. For each narrowcast signal output from the demultiplexer, an optical combiner combines the broadcast signal and the narrowcast, and the resulting signal is transmitted to the designated fiber node for delivery to the receiving devices as previously above.

There is a growing demand for narrowcast services; however, the existing system architecture is not adequate to meet the growing demand for narrowcast services.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
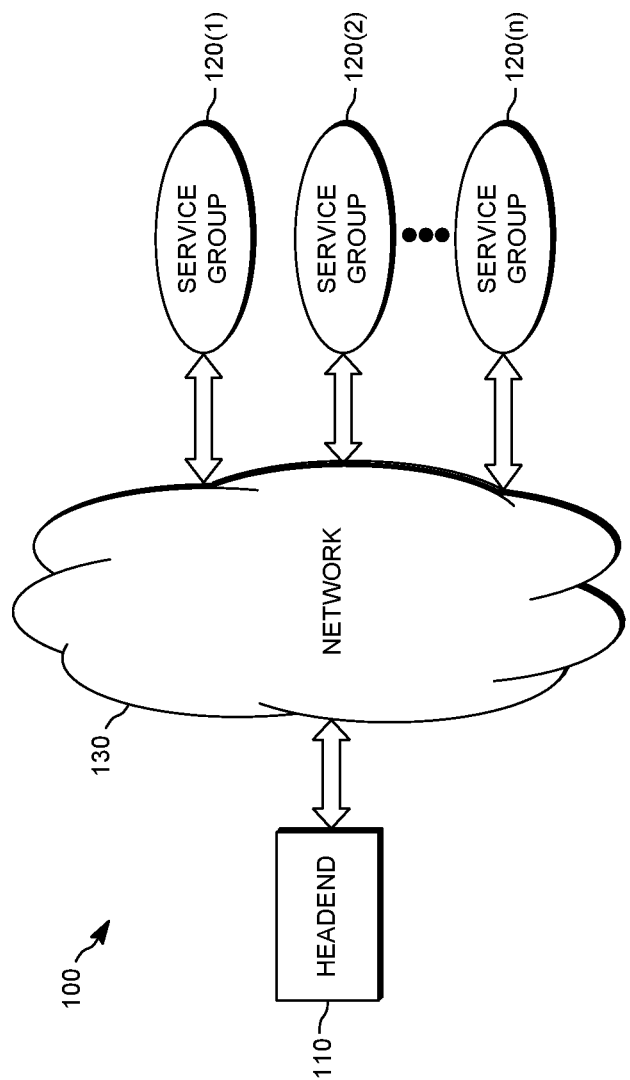
FIG. 1 is a block diagram illustrating an example cable-based system.

FIG. 1 illustrates an example cable-based system 100 operable to deliver high-definition digital entertainment and telecommunications such as video, voice, and high-speed Internet services over a cable network 130 between a headend 110 and one or more service groups of receiving devices such as cable modems (CMs) and/or settop boxes (STBs) 120(1), . . . , 120(n).

Analog video signals and digital bit streams representing various services (e.g., video, voice, and Internet) from various digital information sources are received at the headend 110 and converted to radio frequency (RF) optically modulated signals for transmission over the cable network 130. The cable network 130 can take the form of an all-coax, all-fiber, hybrid fiber/coax (HFC) network, or otherwise. Traffic transferred from the headend 110 to a receiving device can be said to travel in a downstream direction; conversely, traffic transferred from a receiving device to the headend 110 can be said to travel in an upstream direction.

Figure 2:
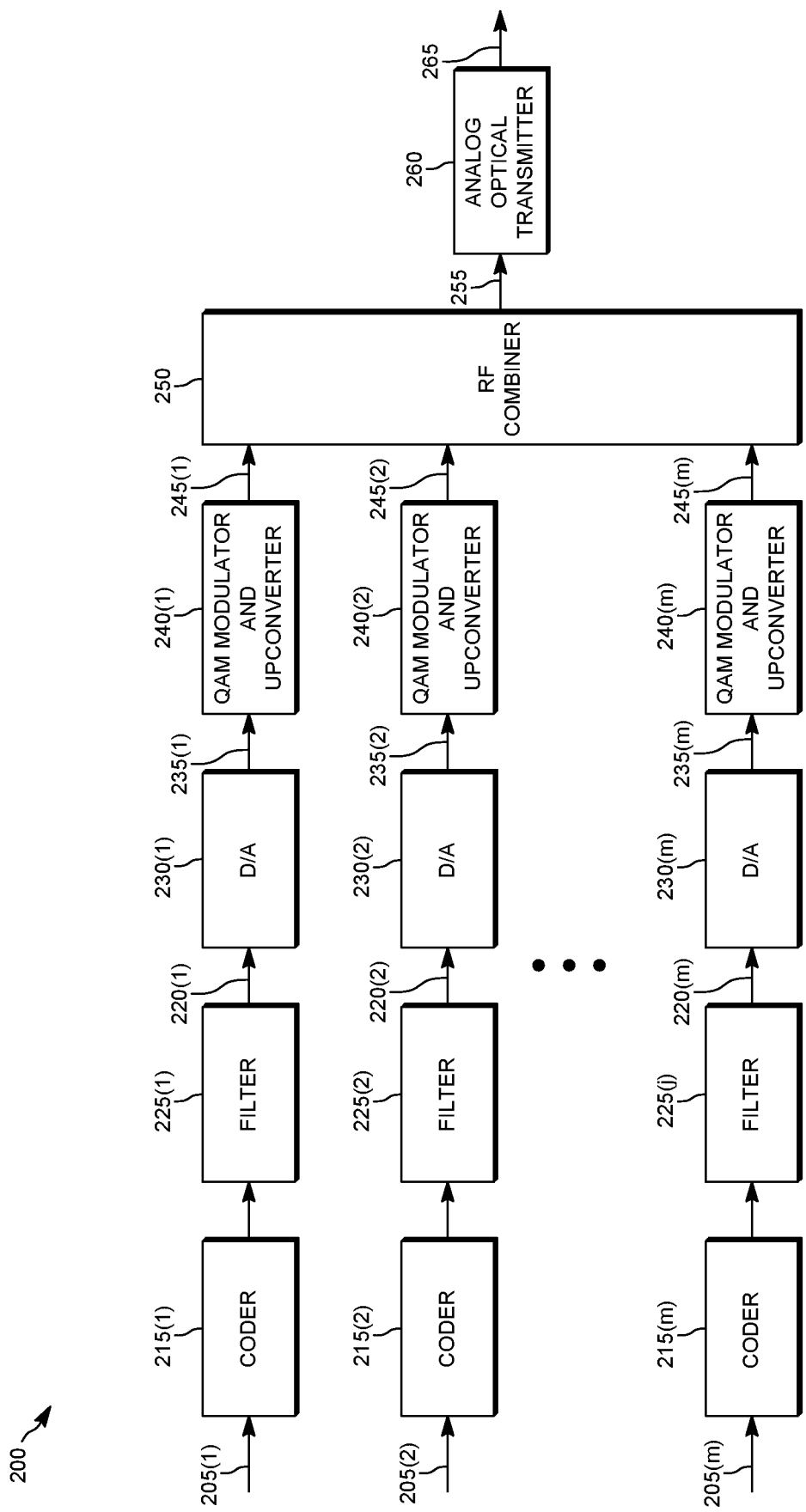
FIG. 2 is a block diagram illustrating an example processing chain in a headend to convert one or more digital bit streams to an RF optically modulated signal.

FIG. 2 illustrates an example processing chain 200 in the headend 110 to convert one or more digital bit streams 205(1), . . . , 205(m) to an RF optically modulated signal 265. For each digital bit stream 205(j), j=1, . . . , m, a channel coder 215(j) encodes the digital bit stream 205(j) to produce a corresponding digital quadrature amplitude modulation (QAM) symbol stream 220(j), for example, as specified in ITU-T Recommendation J.83 (12/07), Annex B [ITU-T J.83-B], "Digital multi-programme systems for television sound and data services for cable distribution." The corresponding digital quadrature amplitude modulation (QAM) symbol stream 220(j) may be based upon filtering 225(j).

Each of the digital QAM symbol streams 220(j), j= 1, . . . , m, are converted to an analog QAM symbol stream 235(j) by a digital to analog (D/A) converter 230(j). Each of the analog QAM symbol streams 235(j), j=1, . . . , m, is modulated onto an RF carrier signal having a frequency f that corresponds to a center frequency of a 6 MHz-wide RF channel by a QAM modulator and upconverter 240(j).

The analog single-channel modulated RF carrier signals 245(1), . . . , 245(m) can be combined by an RF combiner 250 to produce an analog multi-channel RF signal 255. An analog optical transmitter 260 converts the analog multi-channel RF signal 255 to an RF optically modulated signal 265.

One or more of the processing blocks of the example processing chain 200 can be re-arranged and/or eliminated and additional blocks can be added to achieve a desired result. For example, the signals can be converted to analog signals later in the chain, for example, after the channels are combined.

Figure 3:
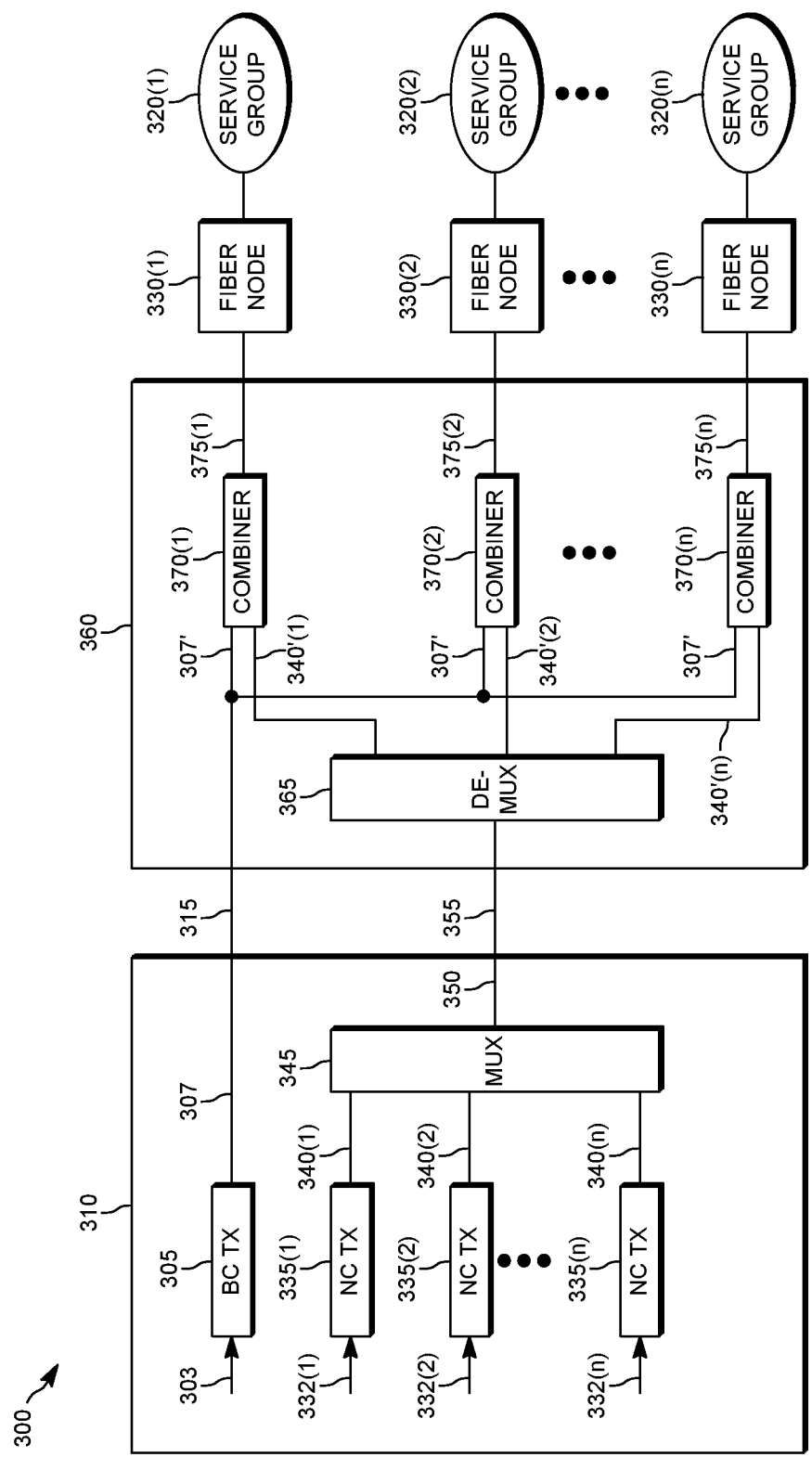
FIG. 3 is a block diagram illustrating an existing overlay system.

FIG. 3 illustrates an overlay system 300. In the headend 310, a broadcast analog optical transmitter 305 receives an analog single or multi-channel RF signal 303 (such as one of the analog single-channel modulated RF carrier signals 245(j) or the analog multi-channel RF signal 255 of FIG. 2). The analog broadcast transmitter 305 converts the analog RF signal 303 to a broadcast RF optically modulated signal 307 and transmits the broadcast RF optically modulated signal 307 downstream on a first fiber 315.

For narrowcast services, for each fiber node 330(i), i= 1 . . . , n in the overlay system 300, there exists a corresponding narrowcast analog optical transmitter 335(i) in the headend 310 to produce narrowcast RF optically modulated signals designated for the fiber node 330(i). Each of the narrowcast analog optical transmitters 335(i), i= 1 . . . , n receives an analog single or multi-channel RF signal 332(i) (such as one of the analog single-channel modulated RF carrier signals 245(j) or the analog multi-channel RF signal 255 of FIG. 2) and converts the RF signal 332(i) to a narrowcast RF optically modulated signal 340(i) at a particular wavelength $\lambda_i$.

An optical multiplexer 345 multiplexes (e.g., via dense wavelength division multiplexing) the narrowcast RF optically modulated signals 340(1), . . . , 340(n) produced by the narrowcast analog optical transmitters 335(1), . . . , 335(n), respectively, to produce a multi-wavelength RF optically modulated signal 350 for transmission on a second fiber 355.

The broadcast RF optically modulated signal 307 transmitted on the first fiber 315 and the multi-wavelength RF optically modulated signal 350 transmitted on the second fiber 355 can be received at an optical transition node ("OTN") 360. At the OTN 360, the narrowcast signals are demultiplexed by an optical demultiplexer 365. For each narrowcast signal 340'(i), i=1, . . . , n (representing narrowcast RF optically modulated signal 340(i)) output from the demultiplexer 365, an optical combiner 370(i) optically combines the narrowcast signal 340'(i) and the broadcast signal 307' (representing broadcast RF optically modulated signal 307). The resulting signal 375(i) is transmitted to the designated fiber node 330(i).

Each of the fiber nodes 330(i), i=1, . . . , n includes an optical receiver that converts the received RF optically modulated signal 375'(i) (representing signal 375(i)) to an electrical signal including broadcast and narrowcast services. The electrical signal then can be transmitted to receiving devices that are served by the fiber node 330(i) (e.g., service group 320(i)). All of the receiving devices served by the fiber node can receive the electrical signals. The portion of the electrical signal representing a broadcast service is processed by each receiving device served by the fiber node and then the broadcast service is delivered to the subscriber. For the portion of the electrical signal representing a narrowcast service, the receiving device to which the electrical signal is addressed can process and deliver the corresponding narrowcast service to the subscriber.

As previously discussed, there is a growing demand for narrowcast services. Delivering more narrowcast content to meet the growing demand can require an increase in the number of narrowcast channels used by each narrowcast optical transmitter $335(i)$, i=1 . . . , n. Node segmentation also can be used to deliver more narrowcast content to a fiber node. With node segmentation, additional narrowcast content is delivered to a fiber node by transmitting narrowcast content at a plurality of wavelengths designated for the fiber node. Thus, node segmentation can require more narrowcast optical transmitters $335(i)$, i=1 . . . , n to produce narrowcast signals at the additional wavelengths for the fiber nodes.

Due to various effects, such as fiber nonlinear intermodulation effects, the number of narrowcast channels that can be used by each narrowcast optical transmitter $335(i)$, i=1 . . . , n can be limited. Furthermore, an increase in the number of wavelengths in the multi-wavelength RF optically modulated signal 350 transmitted on the second fiber 355 can require additional EDFA amplifiers (not shown) along the fiber link 355 between the headend 310 and the OTN 360 to preserve system performance. Due to these limitations, for example, existing overlay system architectures, such as the overlay system 300 in FIG. 3, are not adequate to meet the growing demand for narrowcast services. It further should be noted that to maintain an appropriate relative signal level of the broadcast signal and narrowcast signal output from each of the fiber nodes $330(i)$, the optical levels of the broadcast signal 307' and narrowcast signal 340' (i) input to each combiner $370(i)$ must be carefully controlled. This can be costly.

Further, a substantial portion of the existing downstream fiber links are in an overlay architecture similar to the overlay system 300 of FIG. 3 with limited amounts of fiber capacity available to an OTN 360. To increase the number of fibers run to an OTN involves cost-prohibitive outside plant work to, for example, trench new fiber capacity. Thus, it can be desirable to modify the existing architecture in a cost effective manner to meet the growing demand for narrowcast services and position the existing overlay systems for additional future modifications, for example, to improve performance and meet future requirements such as the requirements of the converged media access platform (CMAP).

Figure 4:
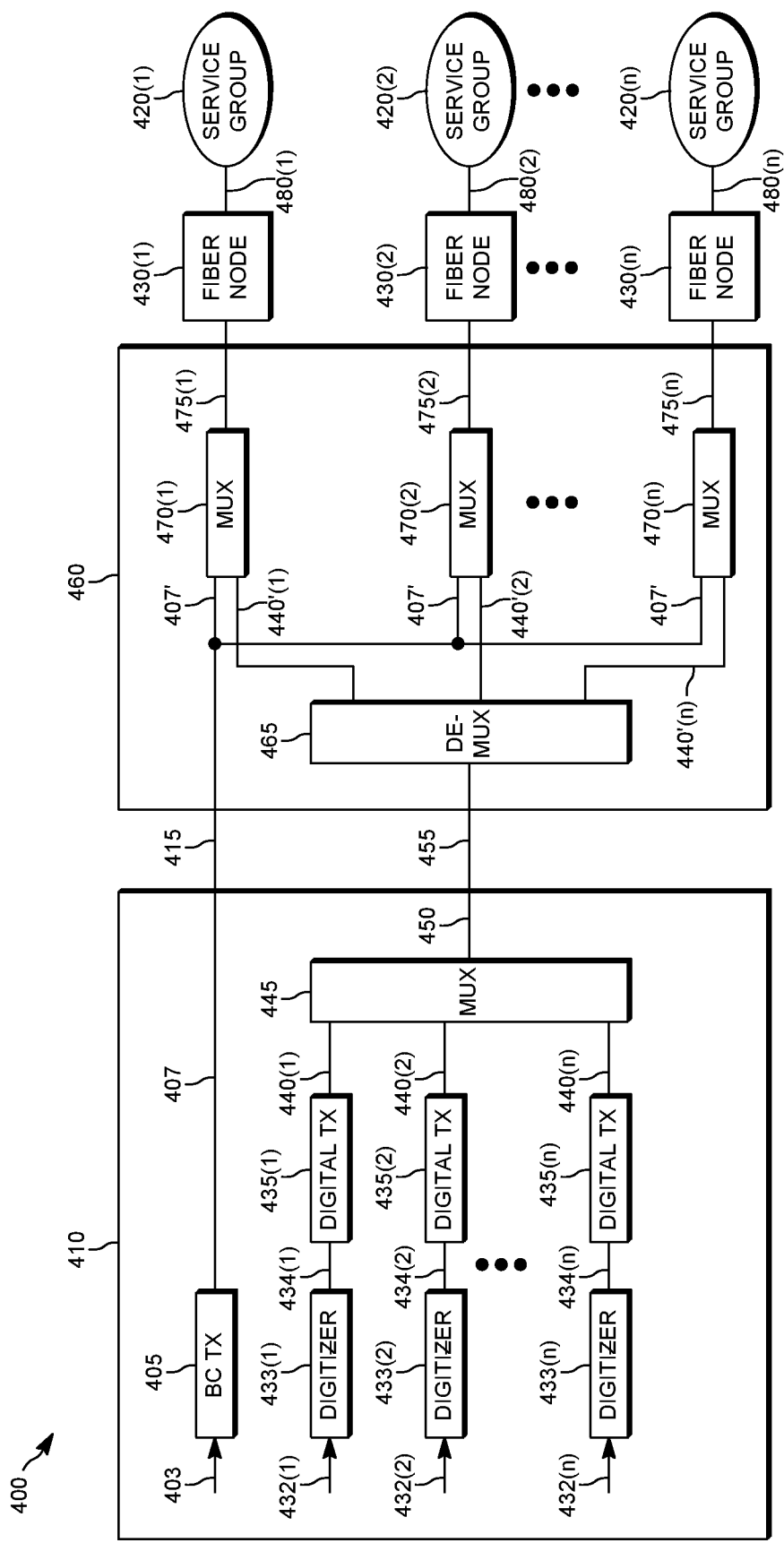
FIG. 4 is a block diagram illustrating an improved based overlay system.

FIG. 4 illustrates a modified overlay system 400 that includes the headend 410, a broadcast analog optical transmitter 405 receives an analog single or multi-channel RF signal 403 (such as one of the analog single-channel modulated RF carrier signals $245(j)$ or the analog multi-channel RF signal 255 of FIG. 2). The analog broadcast transmitter 405 converts the analog RF signal 403 to a broadcast RF optically modulated signal 407 and transmits the broadcast RF optically modulated signal 407 downstream on a first fiber 415.

Figure 5:
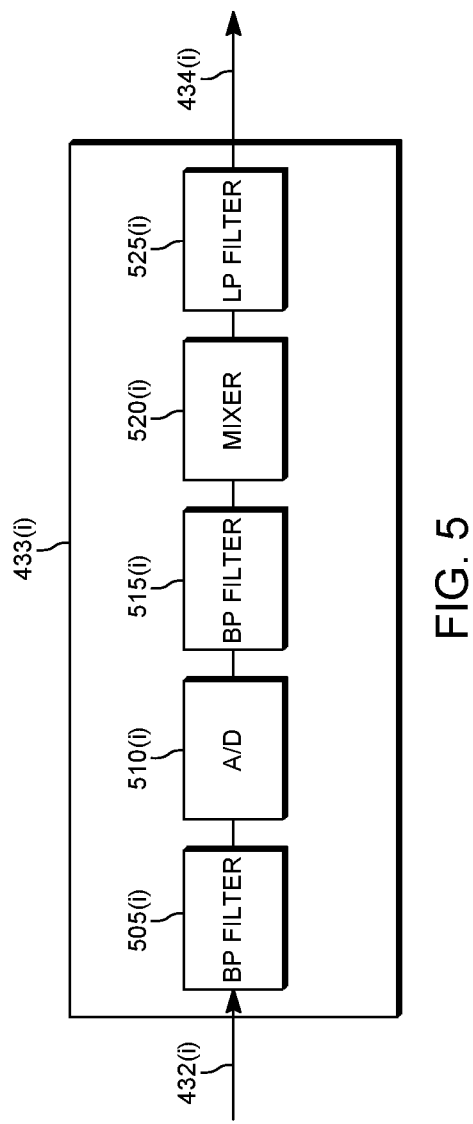
FIG. 5 is a block diagram illustrating an example implementation of the digitizers in overlay system of FIG. 4.

Digitizers $433(i)$, i=1 . . . , n re-digitize the analog-modulated RF narrowcast signals $432(i)$, i=1 . . . , n (e.g., one of the analog single-channel modulated RF carrier signals $245(j)$ or the analog multi-channel RF signal 255 of FIG. 2), respectively, destined for narrowcast transmitters. As previously discussed with respect to FIG. 2, the analog RF signals $432(i)$, i=1 . . . , n are derived from digital bit streams that are QAM encoded and modulated. The RF signals $432(i)$, i=1 . . . , n are derived from digital bit streams that are converted to analog signals and then re-digitized. FIG. 5 illustrates an example implementation of the digitizer $433(i)$ in FIG. 4. A bandpass filter $505(i)$ filters the analog RF signal $432(i)$ to filter out signals outside the frequency range for analog RF signal $432(i)$. The resulting signal is converted to a digital signal by A/D converter $510(i)$ operating at a high sampling rate. The digital signal can be filtered further by bandpass filter $515(i)$, down converted to a baseband signal by a digital mixer $520(i)$, and digitally low pass filtered by filter $525(i)$ to produce a digitized signal $434(i)$ with limited bandwidth that can be sampled at a lower rate. Any digitizer may be used, as desired.

Referring again to FIG. 4, the digitized RF signals $434(i)$, i=1 . . . , n are received by narrowcast digital optical transmitters $435(i)$, i=1 . . . , n, which convert the digitized RF signals to narrowcast RF optically modulated signals $440(i)$, i=1 . . . , n at particular wavelength $\lambda_i$, i=1, . . . n, respectively.

An optical multiplexer 445 combines (e.g., via dense wavelength division multiplexing) the narrowcast RF optically modulated digital signals $440(i)$, . . . , $440(n)$ produced by the narrowcast digital optical transmitters $435(1)$, . . . , $435(n)$, respectively, to produce a multi-wavelength RF optically modulated signal 450 for transmission on a second fiber 455.

The broadcast RF optically modulated signal 407 transmitted on the first fiber 415 and the multi-wavelength RF optically modulated signal 450 transmitted on the second fiber 455 can be received at OTN 460. At the OTN 460, the narrowcast signals can be demultiplexed by an optical demultiplexer 465. For each narrowcast signal $440'(i)$, i=1, . . . , n (representing narrowcast RF optically modulated signal $440(i)$) output from the demultiplexer 465, an optical multiplexer $470(i)$ multiplexes (e.g., via dense wavelength division multiplexing) the narrowcast signal $440'(i)$ and the broadcast signal 407' (representing broadcast RF optically modulated signal 407). The resulting signal $475(i)$ transmitted to the designated fiber node $430(i)$.

Each of the fiber nodes $430(i)$, i=1, . . . , n converts the received RF optically modulated signals $475'(i)$, i=1, . . . , n (representing signal $475(i)$) to electrical signals including broadcast and narrowcast services. The electrical signals $480(i)$ then are transmitted to the corresponding service group $420(i)$.

Figure 6:
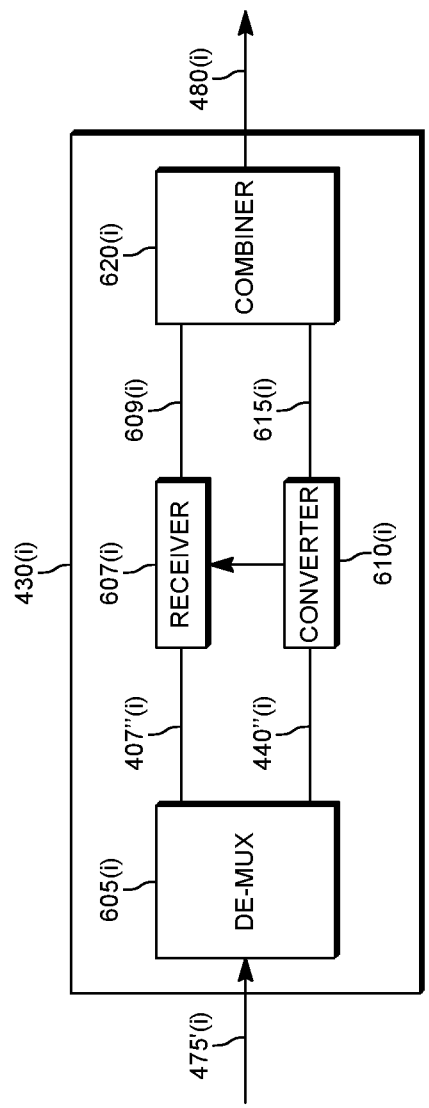
FIG. 6 is a block diagram illustrating an example implementation of the fiber nodes in the overlay system of FIG. 4.

FIG. 6 illustrates an example implementation of the fiber nodes $430(i)$. In each of the fiber nodes $430(i)$, i=1, . . . , n, the multiplexed signal $475'(i)$ is demultiplexed by an optical demultiplexer $605(i)$ to produce a broadcast signal 407" that represents the broadcast signal $407'(i)$ and a narrowcast signal $440"(i)$ that represents the narrowcast signal $440'(i)$. A receiver $607(i)$ extracts the broadcast RF-modulated electrical signal $609(i)$ from the optical broadcast signal $407"(i)$ received from the demultiplexer $605(i)$. The narrowcast digital optical signal $440"(i)$ is converted to an analog RF-modulated electrical signal $615(i)$ by converter $610(i)$ and then the analog narrowcast signal $615(i)$ and the analog broadcast signal $609(i)$ are electrically combined by combiner $620(i)$ to produce electrical signal $480(i)$.

Figure 7:
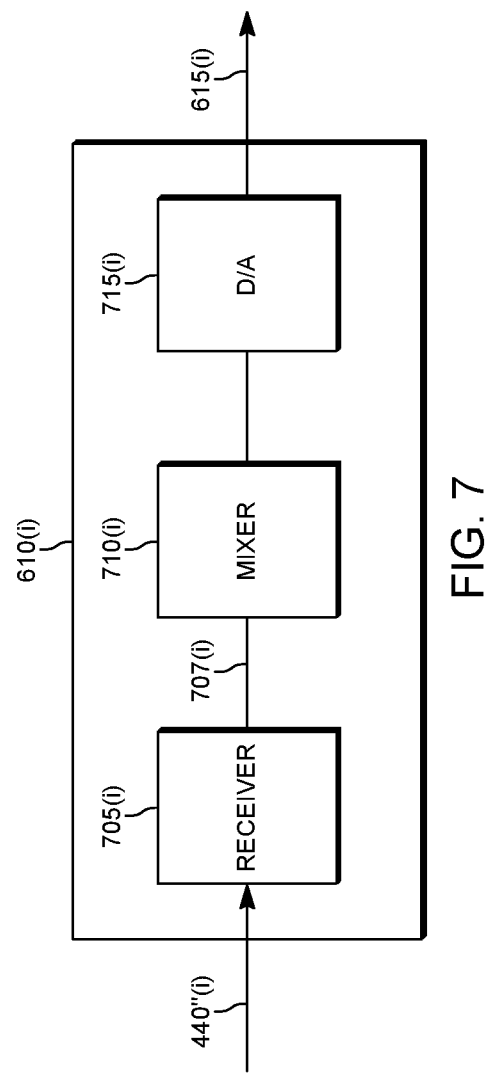
FIG. 7 is a block diagram illustrating an example implementation of the converters in the fiber nodes in FIG. 6.

FIG. 7 illustrates an example implementation of the converter $610(i)$ in FIG. 6. A receiver $705(i)$ extracts the digital signal $707(i)$ from the optical narrowcast signal $440"(i)$ received from the demultiplexer $605(i)$ of FIG. 6. A digital upconverter $710(i)$ frequency shifts the digital signal $707(i)$ to the appropriate channel frequency and the resulting digital signal is converted to an analog signal $615(i)$ by D/A converter 715.

Figure 8:
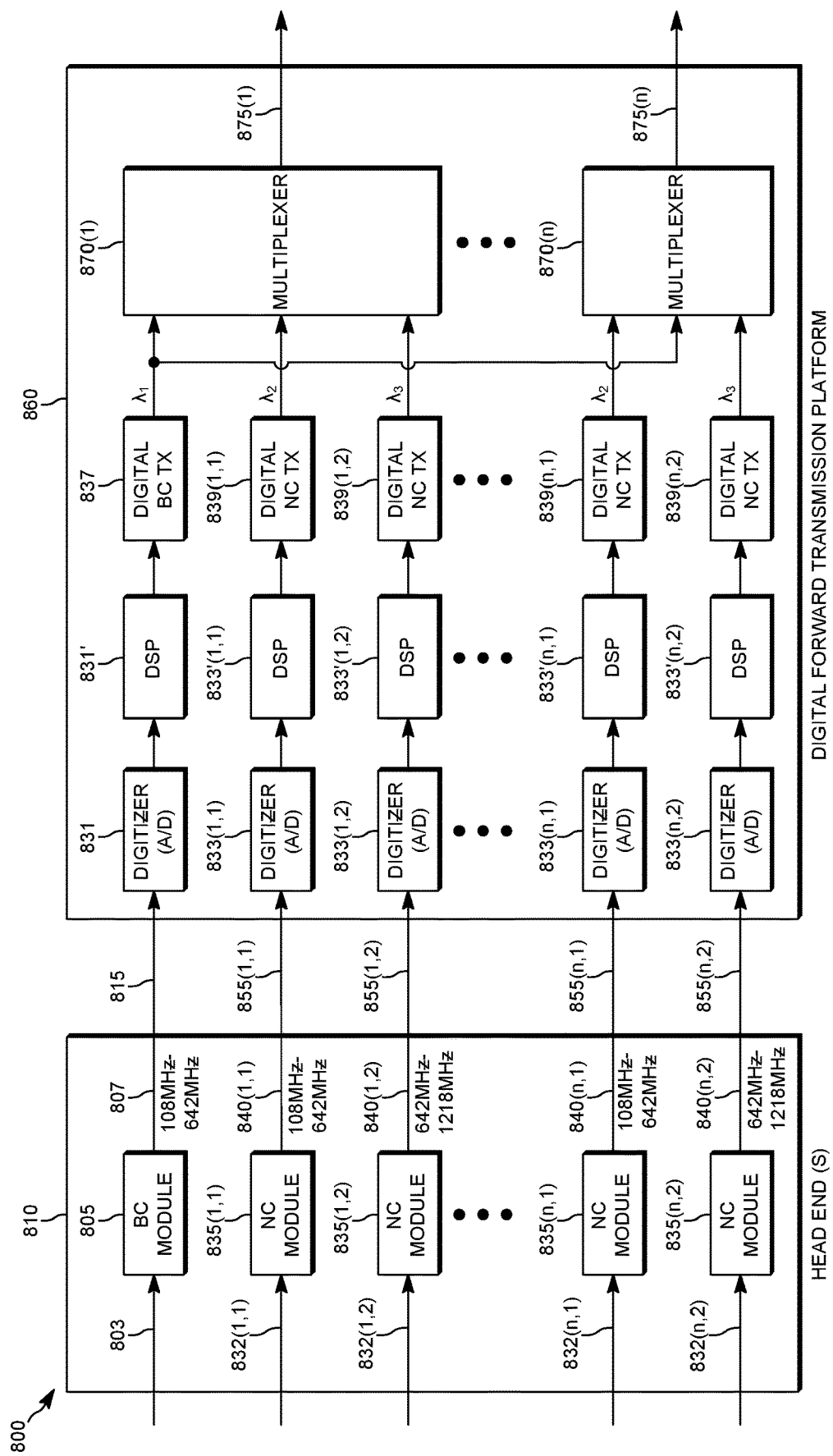
FIG. 8 illustrates a portion of a cable-based system for increased downstream capacity.

FIG. 8 illustrates a modified exemplary system with increased bandwidth capabilities. In a headend 810, a broadcast module 805 receives an analog single or multi-channel RF signal 803 (such as one of the analog single-channel modulated RF carrier signals 245(*j*) or the analog multi-channel RF signal 255 of FIG. 2). The broadcast module 805 may assemble together various services, such as for example, various video channels from a satellite, various video channels from one or more fibers, and/or local content. The broadcast module 805 provides the RF signal 803 to a broadcast RF signal 807 and provides the broadcast RF signal 807 downstream on a first connector 815 or otherwise using a suitable communication channel to another module. The frequency range of the RF signal 807 is typically between 108 MHz and an upper limit of 642 MHz. In some cases, the frequency range of the RF signal 807 is between 550 MHz and an upper limit of 750 MHz. In general, the frequency range of the RF signal 807 is selected among the frequency range that the headend 810 is otherwise designed to provide (e.g., 50 MHz to 750 MHz).

Figure 9:
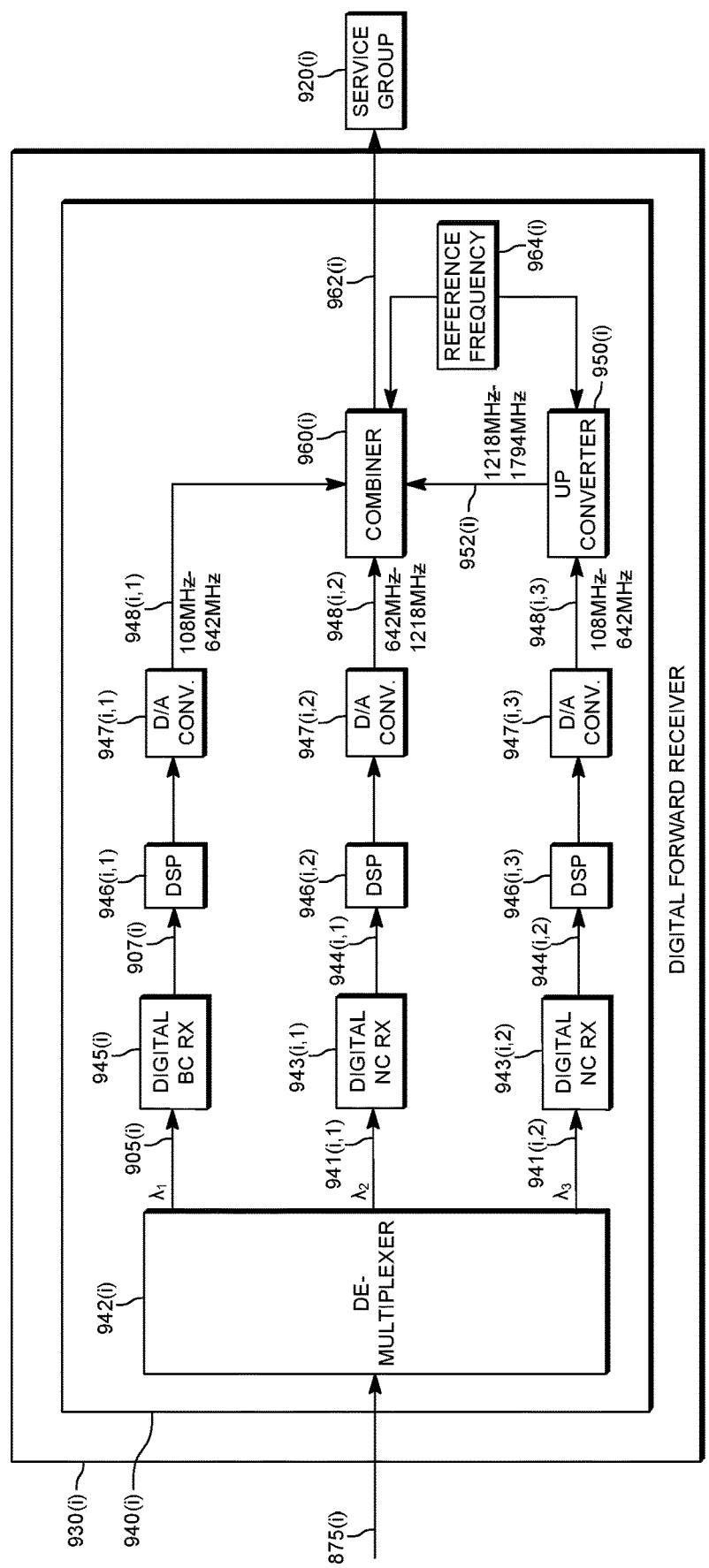
FIG. 9 illustrates another portion of the cable-based system for increased downstream capacity of FIG. 8.

For narrowcast services, for each fiber node 930(*i*), i=1 . . . , n (see FIG. 9) in the system 800, there exists a corresponding plurality of narrowcast modules 835(*i*,1)(*i*,2) in the headend 810 to provide narrowcast RF signals designated for each of the respective fiber nodes 930(*i*) (see FIG. 9). The narrowcast modules 835 may assemble together various services (832), such as for example, CMTS modules that are creating the narrowcast signals. Any number of narrowcast modules may be included in the headend, as desired. In this manner, a plurality of narrowcast modules 835 are associated with a respective fiber node 930(*i*) where a node may be associated with one or multiple narrowcast modules. Each of the narrowcast modules 835(*i*,1)(*i*,2), i=1 . . . , n receives an analog single or multi-channel RF signal 832(*i*,1)(*i*,2) (such as one of the analog single-channel modulated RF carrier signals 245(*j*) or the analog multi-channel RF signal 255 of FIG. 2) and provides the RF signal 832(*i*,1)(*i*,2) to narrowcast RF signals 840(*i*,1)(*i*,2) at a particular frequency range using a suitable communication channel to another module. By way of example, the frequency range of the narrowcast RF signals 840(*i*,1)(*i*,2) is between 108 MHz and 1218 MHz. For example, 840(*i*,1) may be between 108 MHz and 642 MHz and 840(*i*,2) may be between 642 MHz and 1218 MHz. The broadcast module 805 and/or the narrowcast modules 835 may be omitted, if desired. As it may be observed, there may be an overlap between at least a portion of the signals of the RF signal 807 and at least a portion of the narrowcast RF signals 840(*i*,1)(*i*,2), and amongst narrowcast signals 840 resulting in it being problematic to send all the signals down the same fiber or otherwise being simultaneously provided to a same service group 920 (see FIG. 9) and/or customer within the same service group 920. It is noted that a plurality of the headends 810, or sets of transmitters therein, preferably includes a consistent structure that is designed to provide a pre-defined set of output signals at predefined frequency ranges. In addition, it is noted that typically there is not a 1 to 1 correspondence between the inputs (803, 832(*x*,*y*) to the head end 810 and its output signals (815, 855(*x*,*y*)), and any suitable architecture may be used.

The broadcast RF signal 807 provided on the first connector 815 (or otherwise using a suitable communication channel to another module) and the RF signals 840(*i*,1)(*i*,2) provided on the second connectors 855(*i*,1)(*i*,2) (or otherwise using a suitable communication channel to another module) can be received at a digital forward transmission platform ("DFTP") 860.

Digitizer 831 (e.g., analog-to-digital) re-digitize the RF signal 803 destined for a digital signal processor (DSP) 831'. Digitizers 833(*i*,1)(*i*,2), i=1 . . . , n re-digitize the analog-modulated RF narrowcast signals 832(*i*,1)(*i*,2), i=1 . . . , n (e.g., one of the analog single-channel modulated RF carrier signals 245(*j*) or the analog multi-channel RF signal 255 of FIG. 2), respectively, destined for DSPs 833'(*i*,1)(*i*,2), i=1 . . . , n. As previously discussed with respect to FIG. 2, the analog RF signals 803, 832(*i*,1)(*i*,2), i=1 . . . , n are derived from digital bit streams that are QAM encoded and modulated. The RF signals 803, 832(*i*,1)(*i*,2), i=1 . . . , n can be derived from digital bit streams that are converted to analog signals or direct from analog signal sources and are then (re-)digitized. The digital signal processors 831', 833'(*i*,1)(*i*,2) may include any suitable signal processing, including for example, bandpass filters and low pass filters. The digitizers 831, 833(*i*,1)(*i*,2) may include multiple discrete digitizers or otherwise a single digitizer that logically acts as multiple discrete digitizers to digitize each of the received signals. The output of the digital signal processors 831', 833'(*i*,1)(*i*,2) are provided to digital optical transmitters 837, 839(*i*,1)(*i*,2). The digital optical transmitters 837, 839(*i*,1)(*i*,2) may include multiple discrete transmitters or otherwise a single transmitter that logically acts as multiple discrete transmitters to selectively modify each of the received signals. By way of example, digital optical transmitter 837 may use wavelength $\lambda_1$. By way of example, digital optical transmitter 839(*i*,1) may use wavelength $\lambda_2$, where $\lambda_1$ is different from $\lambda_2$. By way of example, digital transmitter 839(*i*,2) may use wavelength $\lambda_3$, where $\lambda_3$ is different from $\lambda_1$ and $\lambda_2$. In addition, for example, the digital transmission may be at a rate of 10 Gbps. A multiplexer 870(*i*) (e.g., dense wavelength division multiplexing or coarse wavelength division multiplexing) may combine the output of the digital optical transmitter 837 and the respective pairs of digital optical transmitters 839(*i*,1)(*i*,2). The multiplexer 870(*i*) may be discrete from the digital transmitters 837, 839(*i*,1)(*i*,2) or otherwise the digital transmitters 837, 839(*i*,1)(*i*,2) may logically include a multiplexer 870(*i*) to combine the respective signals. In this manner, a set of signals can be transmitted from the respective multiplexer 870 that includes signals, with different wavelengths. The resulting signals 875(*i*) from the multiplexer 870 may, for example, be provided using separate optical fibers, and/or different wavelengths (e.g., colors) on the same optical fiber. The resulting signal 875(*i*) is transmitted to the designated fiber node 930(*i*).

By way of example, the headend may be designed to include a single narrowcast module that provides a single frequency range of signals. To increase the bandwidth, multiple such single narrowcast modules may be included that use the same single frequency range of signals. In addition, as an alternative thereto, the single frequency range of signals may be overlapping or non-overlapping with the frequency range of broadcast RF signal. The wavelengths $\lambda_1 \ldots \lambda_n$ of the digital forward transmission platform are selected such that they are different from one another to permit separation by a demultiplexer.

By way of example, the headend may be designed to include a plurality of narrowcast modules each of which provides a different non-overlapping frequency range of signals. To increase the bandwidth, multiple such plurality of narrowcast modules may be included that use the same sets of different non-overlapping frequency ranges of signals. In addition, as an alternative thereto, the plurality of frequency ranges of signals may be overlapping or non-overlapping with the frequency range of broadcast RF signal. The wavelengths $\lambda_1 \ldots \lambda_n$ of the digital forward transmission platform are selected such that they are different from one another with sufficient separation to permit separation by a demultiplexer, typically using 50, 100, or 200 GHz spacing in the optical frequency domain.

The respective fiber nodes 930($i$) include a digital forward receiver ("DFR") 940($i$) to receive the respective resulting signals 875($i$) from the multiplexer 870($i$). The digital forward receiver ("DFR") 940($i$) may include an optical demultiplexer 942($i$) that receives the respective resulting signals 875($i$) and separates the associated wavelengths $\lambda_1 \ldots \lambda_n$. For example, the multiplexed signal 875($i$) is demultiplexed by optical demultiplexer 942($i$) to produce a broadcast signal 905($i$) and narrowcast signals 941($i$,1)($i$,2), typically optically modulated serial binary bitstreams. A digital optical broadcast receiver 945($i$) extracts the broadcast serial binary bitstream as an electrical signal 907($i$) from the optical broadcast signal 905($i$) received from the demultiplexer 942($i$) and provides it to digital signal processing 946 that converts it to binary data suitable for driving an D/A converter 947 that puts out the RF modulated broadcast signal 815 or part thereof. Likewise, a digital optical narrowcast receiver 943($i$,1)($i$,2), DSP 946 and D/A converter 947 extracts the narrowcast RF-modulated electrical signal 944($i$,1)($i$,2) from the optical narrowcast signal 941($i$,1)($i$,2) received from the demultiplexer 942($i$).

The associated set of signals 907($i$), 944($i$,1)($i$,2) are received by an associated DSP (digital signal processor 946($i$,1)($i$,2)($i$,3). The associated DSP 946($i$,1)($i$,2)($i$,3) may include any suitable filtering, as desired. The associated set of signals are received by an associated D/A (digital-to-analog) converter 947($i$,1)($i$,2($i$,3). The respective outputs of the D/A converters 947 ($i$,1)($i$,2) ($i$,3) includes a set of analog signals 948 ($i$,1)($i$,2) ($i$,3) that are preferably consistent with the initial frequency ranges provided by the headend 810. For example, analog signal 948($i$,1) may be a broadcast signal between 108 MHz and 642 MHz which corresponds with broadcast RF signal 807. For example, analog signal 948($i$,2) may be a narrowcast signal between 642 MHz and 1218 MHz which corresponds with the narrowcast RF signals 840($i$,2). For example, analog signal 948($i$,3) may be a narrowcast signal between 108 MHz and 642 MHz which corresponds with the narrowcast RF signals 840($i$,1). As it may be observed, analog signals 948 ($i$,1)($i$, 2)($i$,3) may have overlapping frequency ranges, such as in a manner similar to the output of the headend 810. In general, the signal signals may be received by the demultiplexer and modified, as desired.

The analog signals that have an overlapping frequency range, such as analog signals 948 ($i$,1)($i$,3), are preferably modified in their frequency ranges so that the analog signals 948($i$,1)($i$,2)($i$,3) no longer have overlapping frequency ranges. One or more of the overlapping frequency ranges of the analog signals may be converted to a different frequency range(s), such as by using an up converter 950($i$) to modify analog signal 948($i$,3) to a non-overlapping frequency range and provide an analog signal 952($i$). The up converter 950($i$) may be based upon a reference frequency 964($i$), if desired. For example, analog signal 948($i$,2) may be a narrowcast signal between 642 MHz and 1218 MHz which corresponds with the narrowcast RF optically modulated signal 840($i$,2). For example, analog signal 952($i$) may be a narrowcast signal between 1218 MHz and 1794 MHz which corresponds with the narrowcast RF optically modulated signal 840($i$,1). For example, analog signal 948($i$,1) may be a broadcast signal between 108 MHz and 642 MHz which corresponds with broadcast RF optically modulated signal 807. In this manner, analog signals 948($i$,1)($i$,2), 952($i$) are non-overlapping with one another.

In order to reliably recover the transmitted signal, the demodulator in the cable modem (CM) or set-top box (STB) should be synchronized to the downstream reference. One technique for synchronizing the upconverted downstream channels is to send a reference clock to the CM or STB through the combiner 960($i$). This reference frequency can be derived from the node upconverter local oscillator. A combiner 960($i$) may combine the analog signals 948 ($i$,1) ($i$,2) and analog signal 952($i$). In this manner, a set of signals may be combined that includes analog signals that are non-overlapping with one another. A resulting signal 962($i$) from the combiner 960($i$) may, for example, be transmitted to the associated service group 920($i$) and/or customer premise device within the same service group 920($i$). The resulting signal 962($i$) is preferably an analog signal suitable for being transmitted down a co-axial cable, such as using a QAM or OFDM modulation. The customer premise device within a service group 920($i$) may down convert one or more of the received signals, such as the analog signal 952($i$), for subsequent processing and usage.

The digital forward transmission platform 860 may be constructed in any manner from any number of components thereof. By way of example, the digital forward transmission platform 860 may include an individual processor, such as a field programmable gate array, for each of the digital signal processors 831', 833'(1,1)(1,2) 833'($n$,1)($n$,2). By way of example, the digital forward transmission platform 860 may include an individual processor, such as a field programmable gate array, for each of (1) the digital signal processors 831' and (2) the combination of digital signal processors 833'($i$,1)($i$,2). By way of example, the digital forward transmission platform 860 may include a processor, such as a field programmable gate array, for the combination of (1) the digital transmitter 831' and (2) the combination of digital transmitters 833'($i$,1)($i$,2). By way of example, the digital forward transmission platform 860 may include one or more processors, such as field programmable gate arrays, for each of (1) the digital transmitter 831', (2) one or more of the digital transmitters 833'($i$,1)($i$,2), and combinations thereof.

As it may be observed, the architecture of FIG. 8 and FIG. 9 facilitates using the same architecture of the headend 810, together with a digital forward transmission platform 860 and a receiver digital forward transmission platform 940($i$) to achieve expanded network bandwidth capabilities to transmit data, without modification of the headend 810. This reduces the complexity and expense of expanding network bandwidth capabilities to transmit data because the headend 810 does not necessarily need to be modified nor does the network architecture necessarily need to be modified. In other words, the modified system may use the existing cable modem termination system (CMTS) and/or remote PHY architecture, together with upconverting selected portions of the signals and creating an expanded spectrum on top of the traditional architecture. This modified system is in contrast to a traditional cable network where the spectrum of the outputs from the headend 810 are the limiting factor for the spectrum of the inputs to the corresponding remote fiber nodes and/or the devices of the service groups. As it may be observed, the existing broadcast video modulators, CCAP and CMTS, provide traditional BC and NC signals without modifications being required, with the digital forward transmission platform and the digital forward receiver providing the enhanced capabilities.

Traditionally the CMTS provided all of the physical layer processing in a non-distributed architecture. In general, for a distributed system the CMTS may provide substantially all the MAC layer processing, while the remote fiber nodes may provide a portion of or substantially all of the physical layer processing.

In general, it is desirable to provide an increasing amount of bandwidth to provide an increasing amount of data to the cable modems (CMs) and/or the settop boxes (STBs), generally referred to as users, while at the same time reducing the expense and complexity involved with modification of the corresponding networking providing such an increasing amount of bandwidth. With increasing frequencies associated with the increasing amount of bandwidth, the amplifiers in the network tend to require increasing amounts of power, tend to be increasingly complex, tend to result in increasing amounts of noise as the cascade of amplifiers in the network increases thus requiring a higher power output, and tend to result in increasing amounts of loss between amplifiers as a result of higher frequencies.

Figure 10:
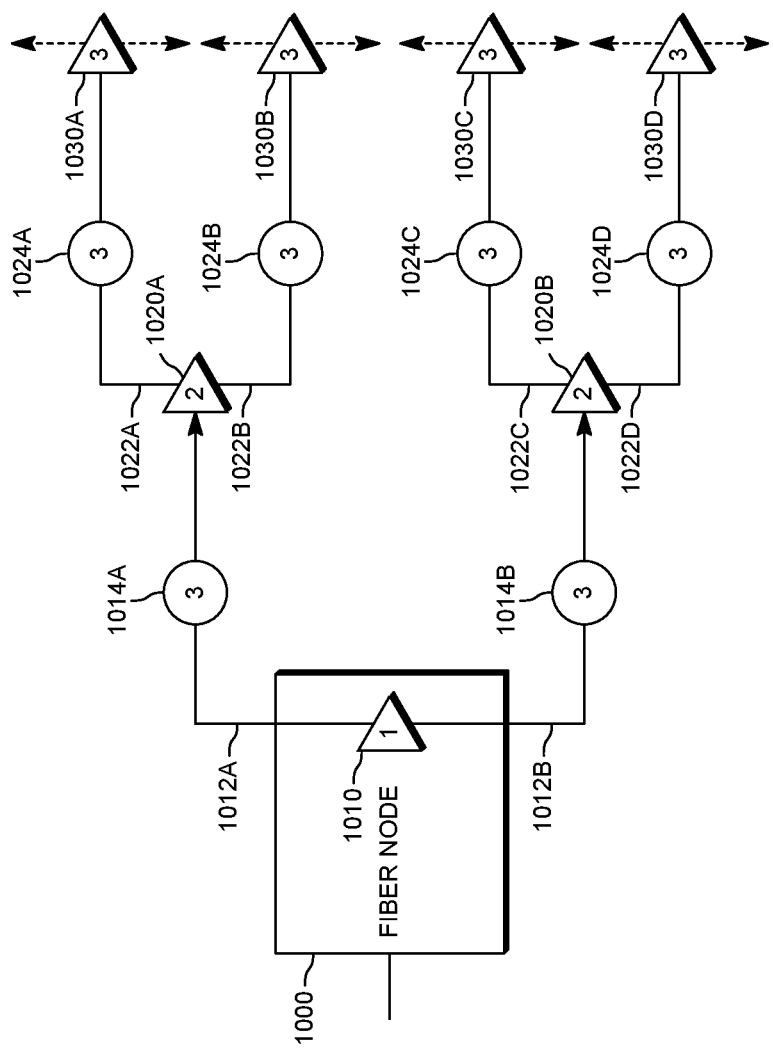
FIG. 10 illustrates a network topology with a cascade of amplifiers.

Referring to FIG. 10, an exemplary network topology includes a fiber node 1000 that includes an associated fiber node amplifier 1010, which is representative of the RF amplifier section of the fiber node. The fiber node amplifier 1010 provides a plurality of branches, such as two branches 1012A, 1012B. Each of the branches may support a plurality of users 1014A (e.g., 3 users), 1014B (e.g., 3 users), such as 3 users per branch. The combination of the fiber node amplifier 1010 and the plurality of users 1014A, 1014B, may be a first level of the network topology (1 amplifier and 6 users). Each of the branches 1012A, 1012B is connected to a set of branch amplifiers, such as two amplifiers, 1020A, 1020B for coaxial cables.

The amplifiers 1020A, 1020B provide a plurality of branches, such as two branches 1022A, 1022B, 1022C, 1022D. Each of the branches may support a plurality of users 1024A (e.g., 3 users), 1024B (e.g., 3 users), 1024C (e.g., 3 users), 1024D (e.g., 3 users), such as 3 users per branch. The combination of the amplifiers 1020A, 1020B and the plurality of users 1024A, 1024B, 1024C, 1024D, may be a second level of the network topology (2 amplifiers and 12 users). Each of the branches 1022A, 1022B, 1022C, 1022D is connected to a set of branch amplifiers, such as four amplifiers, 1030A, 1030B, 1030C, 1030D for coaxial cables.

This process of including additional layers may be continued until a maximum suitable number of amplifier levels is achieved, such as 6 levels. By way of example, with an average factor 2 split at each amplifier level, with an average of six users per amplifier level, the network will include 378 users with a total of 62 amplifiers (i.e., 2+4+8+16+32) where 32 of which are at the outer split level.

An existing network may, for example, include a range from 5 MHz to 860 MHz with a 50 MHz split between the upstream and the downstream directions. In particular, the upstream may be 5 MHz to 42 MHz, and the downstream may be 54 MHz to 860 MHz. With an increase in the available bandwidth to the users, such an upper bandwidth of 1800 MHz, the total available bandwidth may be distributed among the users in any suitable manner. A first manner of bandwidth distribution is to add the 860 MHz to 1800 MHz to the network as a separate data transmission and distribute that separate data transmission to the users, along with an adjustment of the split to 200 MHz. In particular, the upstream may be below 204 MHz and the downstream may be above 258 MHz. A second manner of bandwidth distribution is to add the 860 MHz to 1800 MHz to the network along with the lower frequencies and distribute 200 MHz to 1800 MHz as data transmission to the users, along with an adjustment of the split to 200 MHz. A third manner of bandwidth distribution is to add the 860 MHz to 1800 MHz to the network along with the lower frequencies and distribute 54 MHz to 1800 MHz as data transmission to the users, while maintaining the split at 50 MHz.

A user group may be referred to as the group of users at a particular amplifier level in the system (such as one of 6 amplifier levels). A maximum frequency, which corresponds to the bandwidth, may be referred to as the maximum signal frequency that is required at any particular amplifier level.

Figure 11:
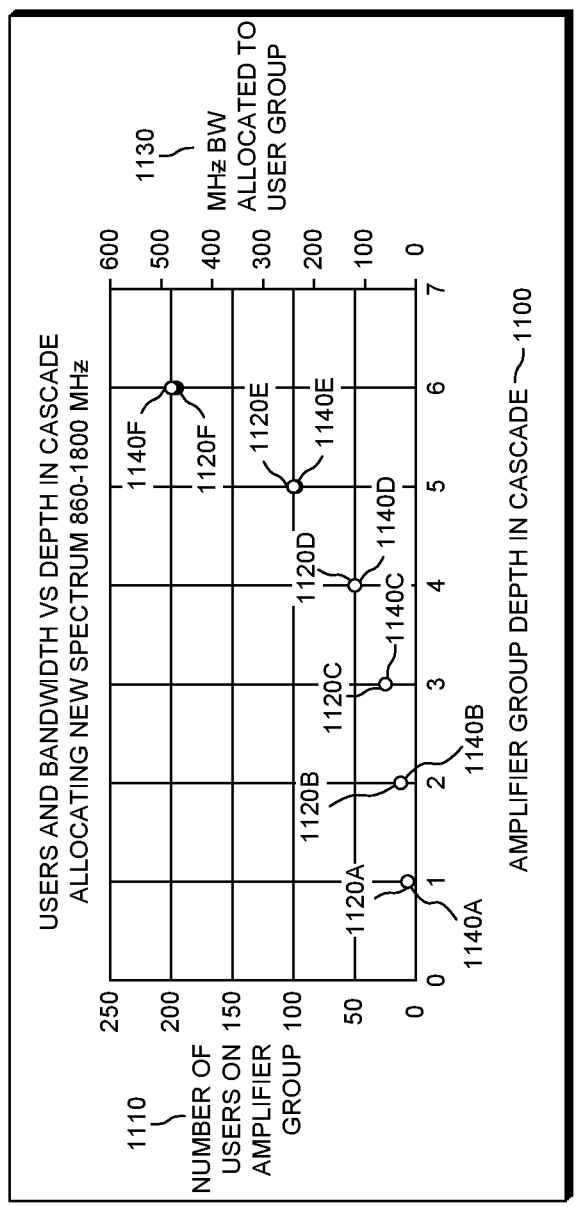
FIG. 11 illustrates the number of users and bandwidth used versus amplifier depth in a cascade.

Referring to FIG. 11, a graph is illustrated of the number of users and the amount of bandwidth that would be allocated among the different amplifier levels of the cascade of FIG. 10. The exemplary graph illustrated FIG. 11 is based upon 1800 MHz total bandwidth, with a 200 MHz split, and 378 users to provide a bandwidth per user of (1800−200)/378 MHz. This is a mean bandwidth reserved per user, in operation dynamic bandwidth allocation can change over time and per user. Different amplifiers levels would allocate different amounts of bandwidth because, at least in part, there are a different number of users at each amplifier level. The horizontal axis illustrates the different amplifier levels 1100. The left vertical axis illustrates the number of users for each amplifier group 1110. For example, the first amplifier group may include 6 users 1120A, the second amplifier group may include 12 users 1120B, the third amplifier group may include 24 users 1120C, the fourth amplifier group may include 48 users 1120D, the fifth amplifier group may include 96 users 1120E, and the sixth amplifier group may include 192 users 1120F. The right vertical axis illustrates the MHz bandwidth allocated to each user group 1130, since each user group includes a different number of users. For example, the first amplifier group may include a relatively small bandwidth allocation 1140A, the second amplifier group may include a relatively small bandwidth allocation (slightly larger than first amplifier group) 1140B, the third amplifier group may include approximately 50 MHz of bandwidth allocation 1140C, the fourth amplifier group may include approximately 100 MHz of bandwidth allocation 1140D, the fifth amplifier group may include approximately 225 MHz of bandwidth allocation 1140E, and the sixth amplifier group may include approximately 475 MHz of bandwidth allocation 1140F. As it may be observed, generally half of the bandwidth allocation is for the sixth amplifier group, namely, the amplifier group with half of the allocated amplifiers.

Figure 12:
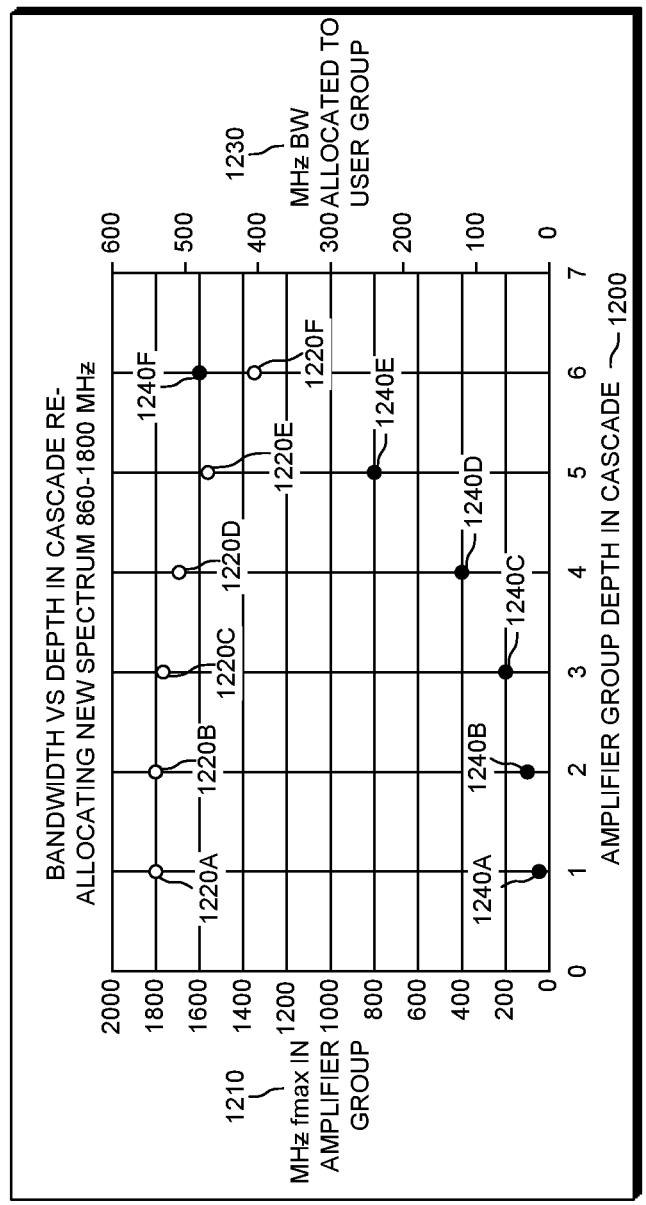
FIG. 12 illustrates the number of users and bandwidth used versus amplifier depth in a cascade for a first case.

Referring to FIG. 12, a graph is illustrated of the number of users and the amount of bandwidth that would be allocated among the different amplifier levels of the cascade of FIG. 10, for the first manner of bandwidth distribution (previously described). By way of reference, the first manner of bandwidth distribution is to add the 860 MHz to 1800 MHz to the network as a separate data transmission and distribute that separate data transmission to the users, along with an adjustment of the split to 200 MHz.

Referring to FIG. 12, the graph illustrates the number of users and the amount of bandwidth that would be allocated among the different amplifier levels of the cascade of FIG. 10 for the first manner of bandwidth distribution (previously described). Different amplifiers levels would allocate different amounts of bandwidth because, at least in part, there are a different number of users at each amplifier level. The horizontal axis illustrates the different amplifier levels 1200. The left vertical axis illustrates the MHz frequency maximum for each amplifier group 1210. For example, the first amplifier group may include a relatively high maximum frequency 1220A, the second amplifier group may include a slightly less relatively high maximum frequency 1220B, the third amplifier group may include a slightly less relatively high maximum frequency 1220C, the fourth amplifier group may include a slightly less relatively high maximum frequency 1220D, the fifth amplifier group may include an increasingly less relatively high maximum frequency 1220E, and the sixth amplifier group may include an even more increasingly less relatively high maximum frequency 1220F. The right vertical axis illustrates the MHz bandwidth allocated to each user group 1230, since each user group includes a different number of users. For example, the first amplifier group may include a relatively small bandwidth allocation 1240A, the second amplifier group may include a relatively small bandwidth allocation (slightly larger than first amplifier group) 1240B, the third amplifier group may include approximately 75 MHz of bandwidth allocation 1240C, the fourth amplifier group may include approximately 125 MHz of bandwidth allocation 1240D, the fifth amplifier group may include approximately 225 MHz of bandwidth allocation 1240E, and the sixth amplifier group may include approximately 475 MHz of bandwidth allocation 1240F. As it may be observed, generally half of the bandwidth allocation is for the sixth amplifier group, namely, the amplifier group with half of the allocated amplifiers. As it may be observed, at the deepest amplifier level 6, only 1400 MHz of the available 1800 MHz is necessary.

Figure 13:
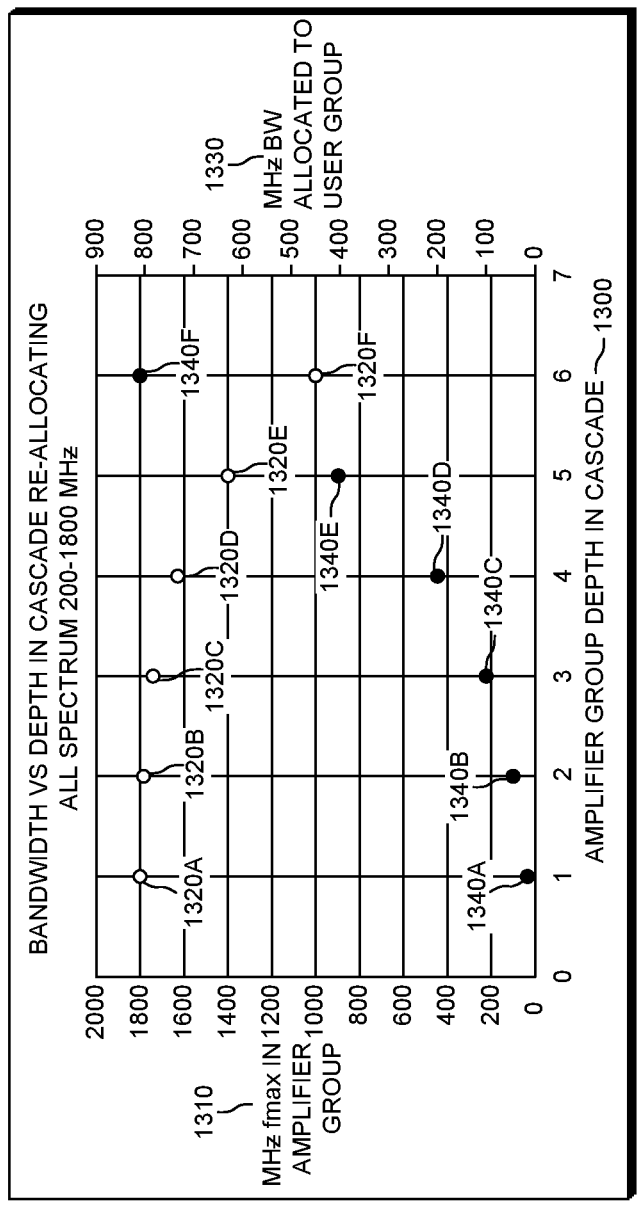
FIG. 13 illustrates the number of users and bandwidth used versus amplifier depth in a cascade for a second case.

Referring to FIG. 13, a graph is illustrated of the number of users and the amount of bandwidth that would be allocated among the different amplifier levels of the cascade of FIG. 10, for the second manner of bandwidth distribution (previously described). By way of reference, the second manner of bandwidth distribution is to add the 860 MHz to 1800 MHz to the network along with the lower frequencies and optimally distribute 200 MHz to 1800 MHz as data transmission to the users, along with an adjustment of the split to 200 MHz.

Referring to FIG. 13, the graph illustrates the number of users and the amount of bandwidth that would be allocated among the different amplifier levels of the cascade of FIG. 10 for the second manner of bandwidth distribution (previously described). Different amplifiers levels would allocate different amounts of bandwidth because, at least in part, there are a different number of users at each amplifier level. The horizontal axis illustrates the different amplifier levels 1300. The left vertical axis illustrates the MHz frequency maximum for each amplifier group 1310. For example, the first amplifier group may include a relatively high maximum frequency 1320A, the second amplifier group may include a slightly less relatively high maximum frequency 1320B, the third amplifier group may include a slightly less relatively high maximum frequency 1320C, the fourth amplifier group may include a slightly less relatively high maximum frequency 1320D, the fifth amplifier group may include an increasingly less relatively high maximum frequency 1320E, and the sixth amplifier group may include an even more increasingly less relatively high maximum frequency 1320F. The right vertical axis illustrates the MHz bandwidth allocated to each user group 1330, since each user group includes a different number of users. For example, the first amplifier group may include a relatively small bandwidth allocation 1340A, the second amplifier group may include a relatively small bandwidth allocation (slightly larger than first amplifier group) 1340B, the third amplifier group may include approximately 100 MHz of bandwidth allocation 1340C, the fourth amplifier group may include approximately 200 MHz of bandwidth allocation 1340D, the fifth amplifier group may include approximately 400 MHz of bandwidth allocation 1340E, and the sixth amplifier group may include approximately 800 MHz of bandwidth allocation 1340F. As it may be observed, a substantial amount of the bandwidth allocation is for the sixth amplifier group, namely, the amplifier group with half of the allocated amplifiers. As it may be observed, at the deepest amplifier level 6, only approximately 1000 MHz of the available 1800 MHz is necessary.

Figure 14:
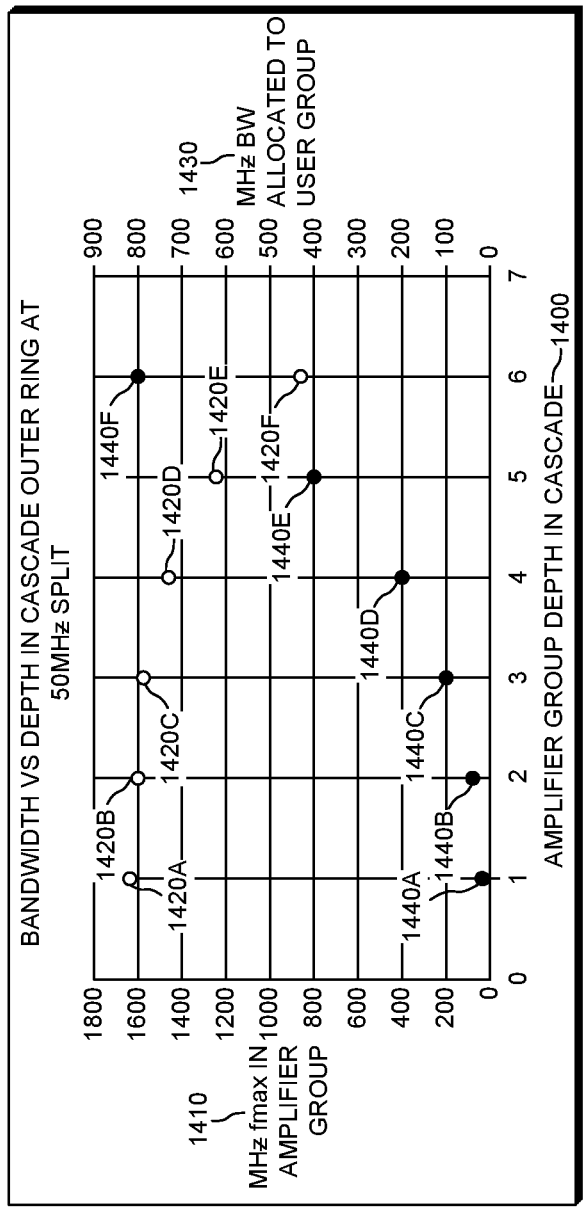
FIG. 14 illustrates the number of users and bandwidth used versus amplifier depth in a cascade for a third case.

Referring to FIG. 14, a graph is illustrated of the number of users and the amount of bandwidth that would be allocated among the different amplifier levels of the cascade of FIG. 10, for the third manner of bandwidth distribution (previously described). By way of reference, the third manner of bandwidth distribution is to add the 860 MHz to 1800 MHz to the network along with the lower frequencies and distribute 54 MHz to 1800 MHz as data transmission to the users, while maintaining the split at 50 MHz.

Referring to FIG. 14, the graph illustrates the number of users and the amount of bandwidth that would be allocated among the different amplifier levels of the cascade of FIG. 10 for the third manner of bandwidth distribution (previously described). Different amplifiers levels would allocate different amounts of bandwidth because, at least in part, there are a different number of users at each amplifier level. The horizontal axis illustrates the different amplifier levels 1400. The left vertical axis illustrates the MHz frequency maximum for each amplifier group 1410. For example, the first amplifier group may include a relatively high maximum frequency 1420A, the second amplifier group may include a slightly less relatively high maximum frequency 1420B, the third amplifier group may include a slightly less relatively high maximum frequency 1420C, the fourth amplifier group may include a slightly less relatively high maximum frequency 1420D, the fifth amplifier group may include an increasingly less relatively high maximum frequency 1420E, and the sixth amplifier group may include an even more increasingly less relatively high maximum frequency 1420F. The right vertical axis illustrates the MHz bandwidth allocated to each user group 1430, since each user group includes a different number of users. For example, the first amplifier group may include a relatively small bandwidth allocation 1440A, the second amplifier group may include a relatively small bandwidth allocation (slightly larger than first amplifier group) 1440B, the third amplifier group may include approximately 100 MHz of bandwidth allocation 1440C, the fourth amplifier group may include approximately 200 MHz of bandwidth allocation 1440D, the fifth amplifier group may include approximately 400 MHz of bandwidth allocation 1440E, and the sixth amplifier group may include approximately 800 MHz of bandwidth allocation 1440F. As it may be observed, a substantial amount of the bandwidth allocation is for the sixth amplifier group, namely, the amplifier group with half of the allocated amplifiers. As it may be observed, at the deepest amplifier level 6, only approximately 825 MHz of the available 1800 MHz is necessary. As it may be observed, only 1650 MHz total forward bandwidth is necessary.

Figure 15:
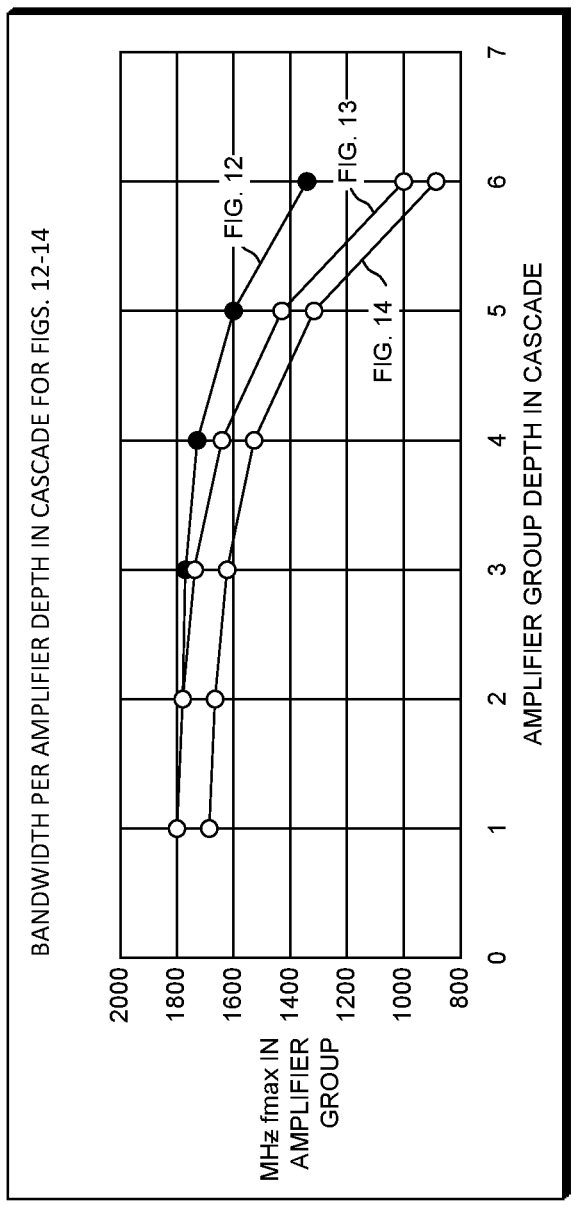
FIG. 15 illustrates a comparison of the number of users and bandwidth used versus amplifier depth in a cascade for FIG. 12, FIG. 13, and FIG. 14.

Referring to FIG. 15, a comparison is illustrated between the different techniques of the re-allocation of the spectrum illustrated in FIG. 12, FIG. 13, and FIG. 14. As it may be observed, based upon the particular spectrum allocation, the there is a significant reduction of the amplifier bandwidth at deeper levels in the cascade. With the decrease in amplifier bandwidth reduction at increasingly greater amplifier group depth, it was determined that increasingly greater amplifier depths may use amplifiers that are only capable of providing, or otherwise provide, increasingly less amplifier bandwidth.

Using amplifiers, at least in part, that have less amplifier bandwidth in selected portions of the network, decreases the complexity of the system and reduces the overall system cost, while permitting effectively the same data bandwidth capabilities. Particularly, in the third case, existing amplifiers at level 6 with for instance 870 MHz of bandwidth may remain in the system without change with this representing half of the amplifiers in the system.

The loss of energy in the signal between amplifiers as a result of the cable is a function of the frequency of the signal, with increasing losses at higher frequencies. There is a minimum power input to the user (e.g., consumer premises device) or the next amplifier stage required to overcome noise in the input stage. Permitting a lower input power at the highest frequency limits the signal to noise ratio, but also results in lower output power requirements for the amplifiers. Further, amplifiers add noise as a function of 10*log(N), where N is the number of amplifiers in the cascade. Accordingly, a reduction in the cascade length required with high bandwidth requirements reduces the amplifier noise and the output power requirements from the amplifiers.

Figure 16:
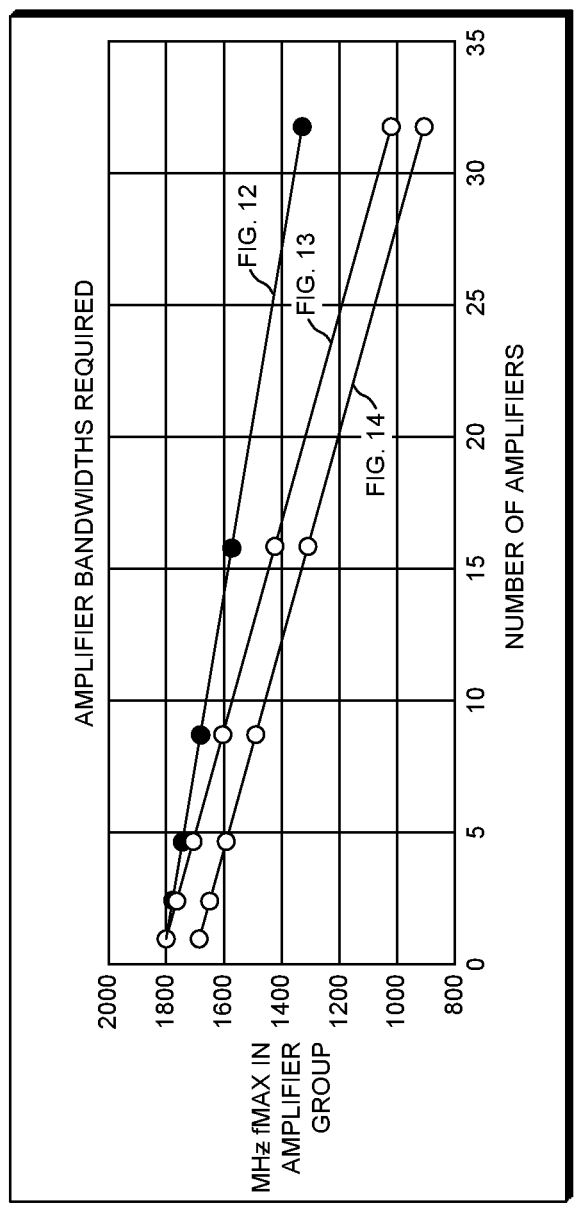
FIG. 16 illustrates the MHz maximum frequency versus the number of amplifiers for FIG. 12, FIG. 13, and FIG. 14.

Referring to FIG. 16, a graph of the amplifier bandwidth required in terms of MHz maximum is illustrated relative to the number of amplifiers. The number of amplifiers are illustrated relative to the re-allocation of the spectrum illustrated in FIG. 12, FIG. 13, and FIG. 14. A large part of the amplifiers, such as 505, does not require high bandwidth.

Figure 17:
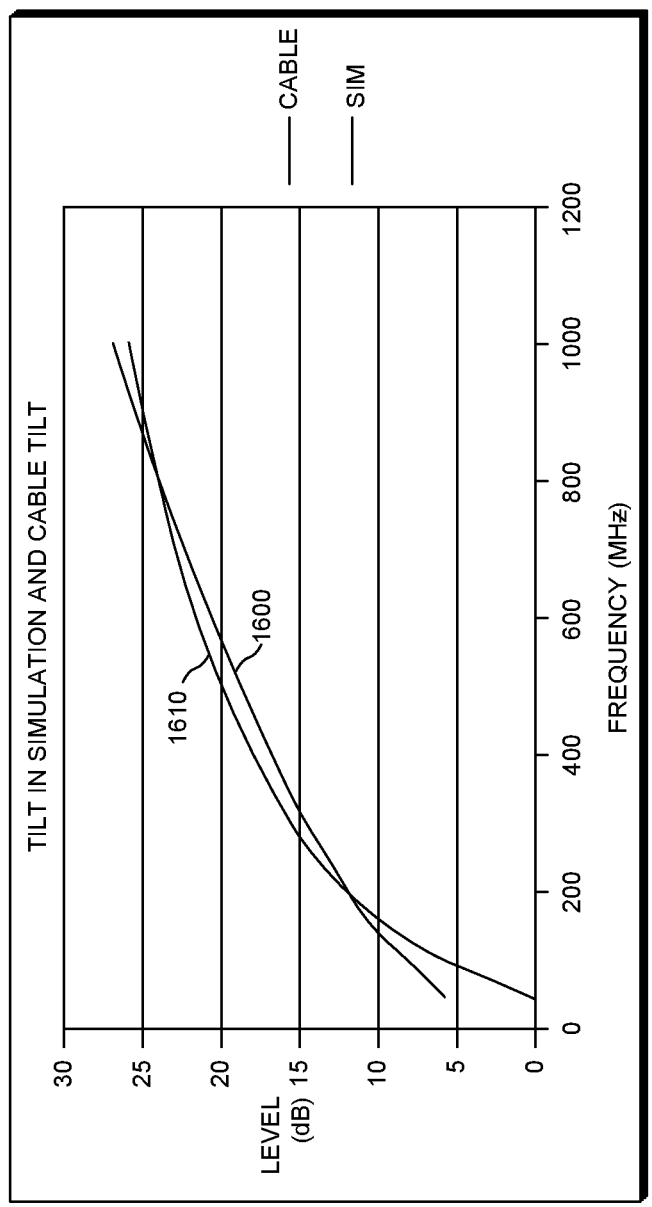
FIG. 17 illustrates cable tilt.

Referring to FIG. 17, a graph of a loss tilt of passive components in a system 1600 and a simulation of cable tilt 1610, illustrates higher losses at higher frequencies. The output power of the amplifier is generally modified with a tilt to overcome the tilt in the loss in such a manner that a substantially frequency independent level is received through the amplifier cascade.

Figure 18:
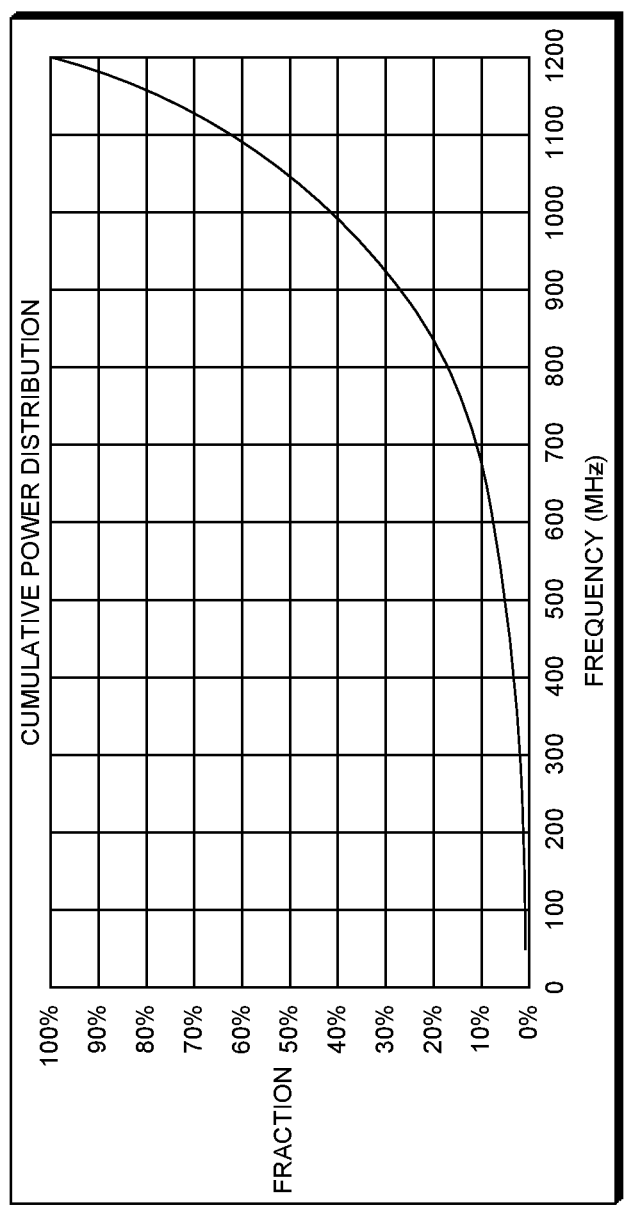
FIG. 18 illustrates power distribution to accommodate cable tilt.

Referring to FIG. 18, a graph of the output power from amplifier output levels is illustrated to accommodate the tilt in such a manner that a substantially frequency independent level is received. As it may be observed, approximately 70% of the amplifier output power is in the top 100 MHz to accommodate the preferred amplifier tilt.

Figure 19:
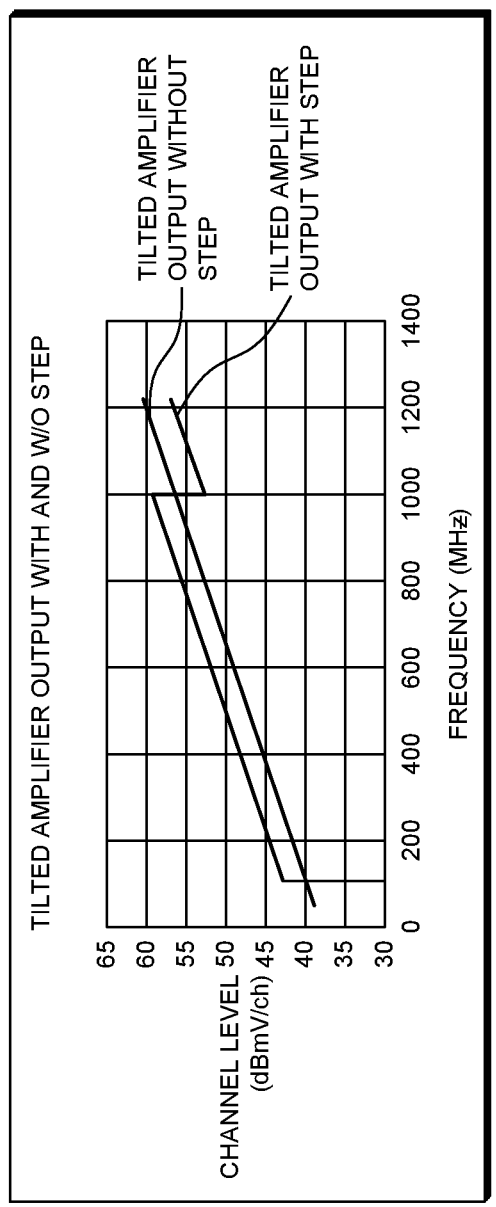
FIG. 19 illustrates a tilted amplifier output with and without a step.

By way of example, a network structure may include amplifiers for amplifier levels 1 through 5 that support a constant maximum bandwidth, and with amplifier level 6 that supports a substantially lower maximum bandwidth, such as 1000 MHz. Referring to FIG. 19, a graph of the output power from amplifier output levels is illustrated to accommodate the tilt in such a manner that a substantially frequency independent signal level is received, where a step-down may be introduced in the signal levels to reduce the required power output from the amplifiers above a certain frequency. Including such a step comes at the cost of a worse signal to noise performance for frequencies above the position of that step, reducing maximum data throughput in that band. It will be shown below that by the use of progressively lower maximum frequency amplifiers at deeper levels in the system a reduction in the output power required from amplifiers can also be obtained without needing to incur a degradation of signal to noise ratio of signals.

Figure 20A:
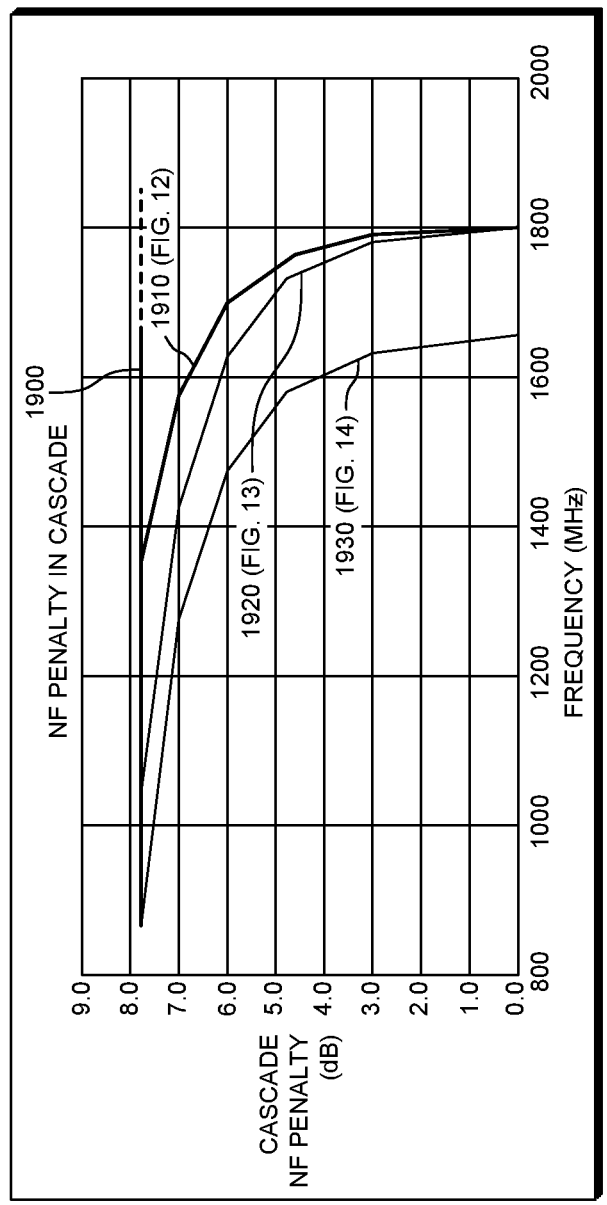
FIGS. 20A and 20B illustrate a noise frequency penalty in an amplifier cascade.
Figure 20B:
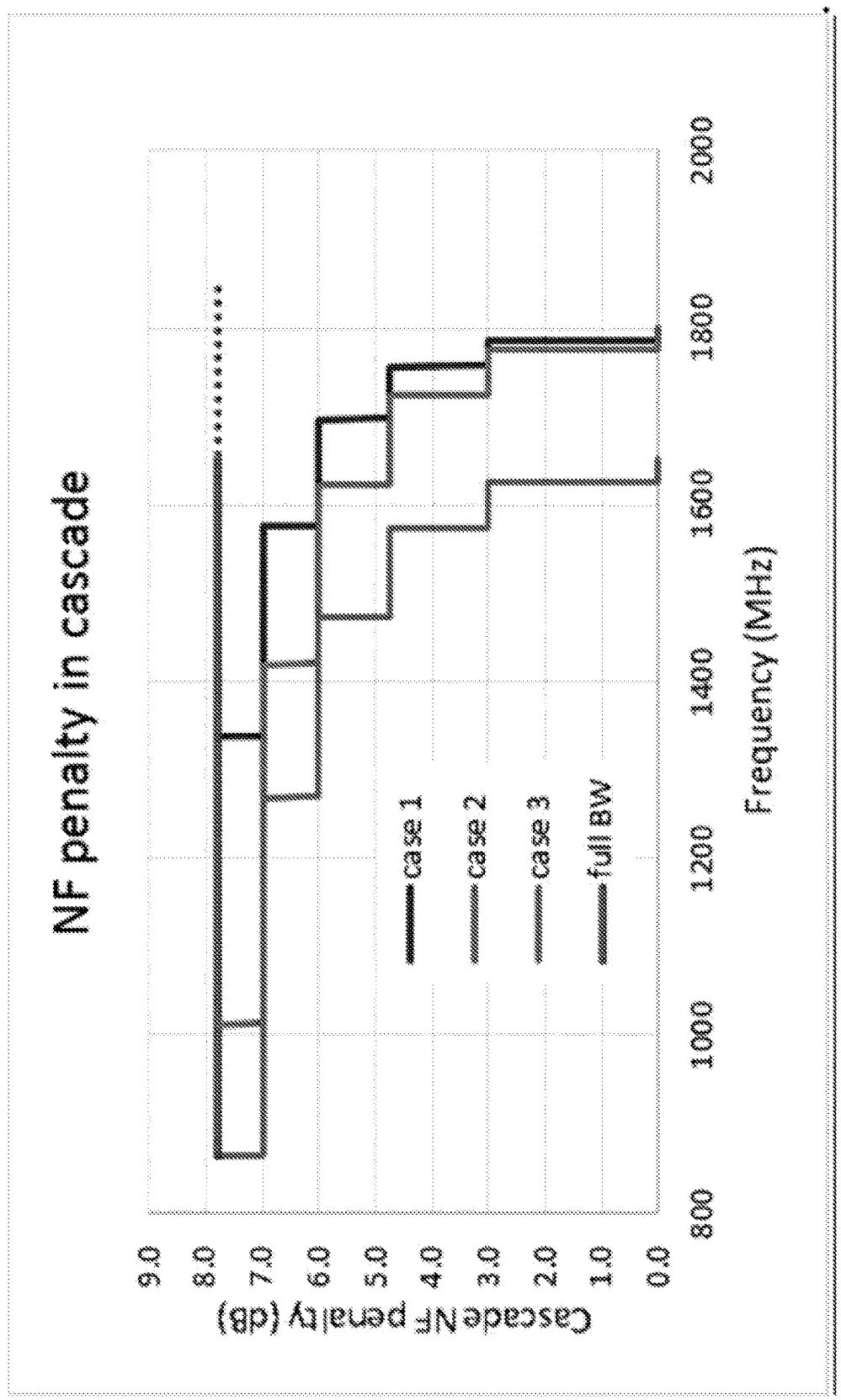

Referring to FIG. 20A and FIG. 20B, graphs of the noise figure penalty in the cascade over frequency is illustrated, with the worst NF penalty at any of the amplifiers receiving and amplifying the frequency plotted on the X-axis. The noise figure penalty due to multiple amplifiers in cascade can be estimated at NFpenalty=10*log(N) with N the number of amplifiers in the cascade that need to support a frequency bandwidth. A noise figure penalty for the full bandwidth for all the amplifier levels is illustrated in straight line 1900. The noise figure remains consistent throughout the system which retains consistent performance across the entire system. A noise figure penalty curve 1910 for case 1 (FIG. 12) is illustrated. A noise figure penalty curve 1920 for case 2 (FIG. 13) is illustrated. A noise figure penalty curve 1930 for case 3 (FIG. 14) is illustrated. As it may be observed, by allowing the user frequency band per location in the network to be modified (see FIG. 12, FIG. 13, FIG. 14), the noise frequency penalty may be reduced by more than 3 dB (e.g., a factor of 2) in the frequency band above 1600 MHz, and up to 8 dB for the highest frequencies, and the required amplifier outpower power is further reduced considering that most of the amplifier power is used for the highest output frequencies.

Figure 21:
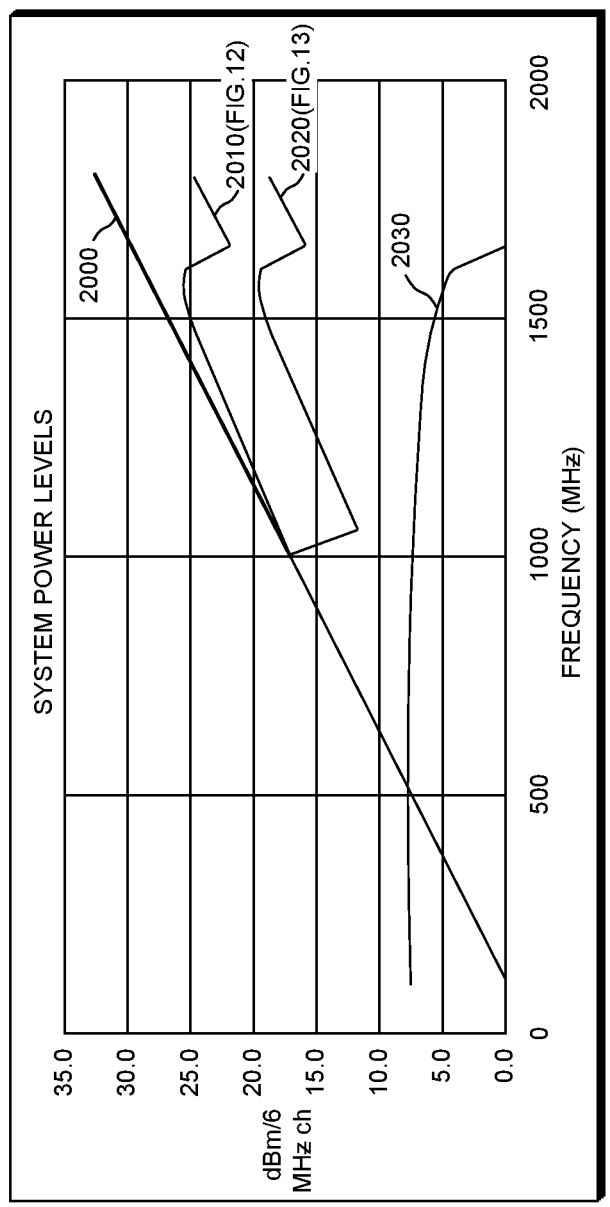
FIG. 21 illustrates using a frequency dependent noise frequency penalty over frequency.

Referring to FIG. 21, a graph of the system power levels based upon noise figure penalty in the cascade over frequency is illustrated. A system power level for the full bandwidth for all the amplifier levels is illustrated in straight line 2000. The system power level remains consistent throughout the system which retains consistent performance across the entire system for all frequencies resulting in a very high cumulative power (9 watts in this example). A system power level curve 2010 for case 3 (FIG. 14) based upon using noise frequency penalty curve 2030 is illustrated. A system power level curve 2020 for case 3 (FIG. 14) including a step-down in level in the frequency spectrum above 1000 MHz based upon using noise frequency penalty curve 2030 is illustrated. As it may be observed, by using a stepped down output power above 1000 MHz by 6 dB drops the power even further (to approximately 1 watt in this example).

Figure 22:
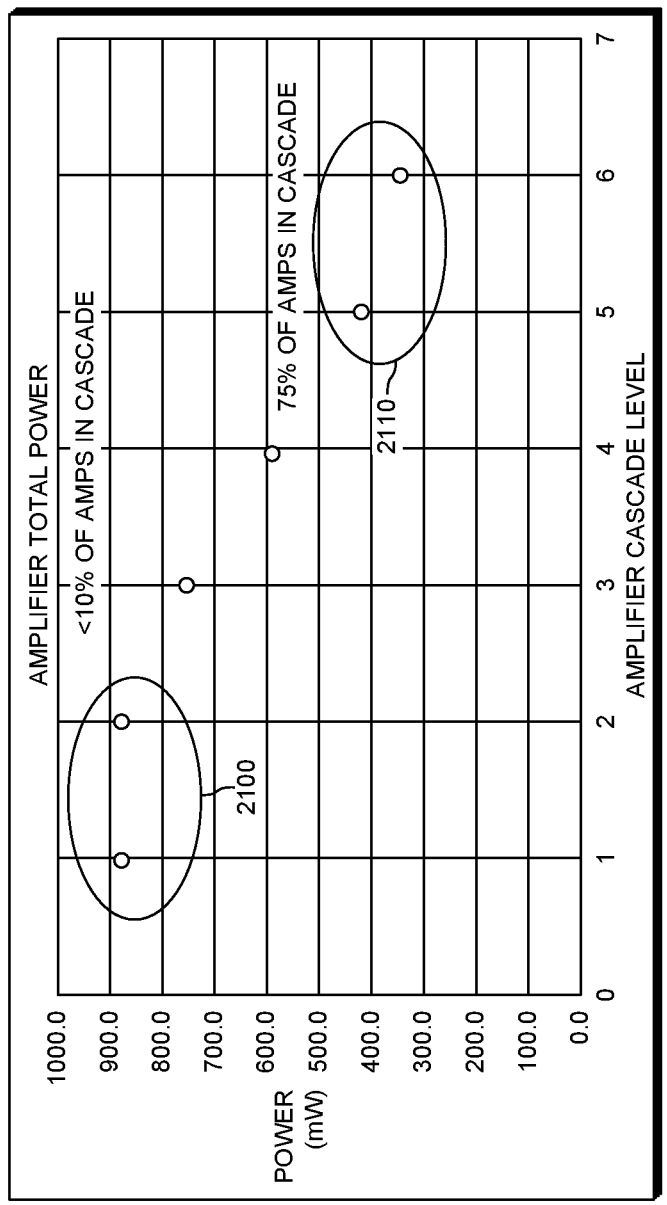
FIG. 22 illustrates amplifier output power using a frequency dependent noise frequency penalty over amplifier depth in a cascade.

Referring to FIG. 22, a graph of the amplifier total power for each cascade level for case 3 is illustrated. It may be observed that only the first two amplifier levels 2100 have very high total power, while being less than 10% of the total number of amplifiers. It may be observed that the last two amplifier levels 2110 have relatively low total power, while being approximately 75% of the total number of amplifiers.

As it may be observed, with a modified set of amplifiers, only the first few amplifier levels in the cascade need to amplify the highest frequencies. The remaining amplifiers in the system should not amplify the highest frequencies. In this manner, the remaining amplifiers will reduce the power usage required to produce low distortions. Furthermore, at the highest frequencies fewer amplifiers need to operate in cascade, further reducing the accumulation of distortions form passing through this lesser number of amplifiers. If desired, the same amplifier may be used in the system, with a cut-off of the highest frequencies with a filter in the amplifier. Optionally the amplifiers may have an adjustable bias to accommodate to the power level needed at that amplifier. If desired, different amplifiers may be used in the system, with different ones being designed with different cut-off frequencies, dependent upon their depth in the cascade.

As it may be observed, the cut-off frequencies for different amplifiers may be dependent upon the amplifier level of the particular amplifier. For example, if desired, up to 6 different cut-off frequencies may be used with 6 different amplifier levels. For example, if desired, a different amplifier may be used for the characteristics desired, such as based upon different amplifier levels. For example, if desired, the same amplifier may be used for the different characteristics desired, such as a modified cut-off frequency based upon different amplifier levels. In addition, it is beneficial to have a limited number of different cut-off frequencies within a particular network, such as 2 different cut-off frequencies, to simplify troubleshooting complexities of the system and reduce the number of different amplifiers that need to be designed, produced, and inventoried.

The allocation of the frequencies in the upstream direction may likewise be varied based upon the amplifier level. By way of example, the deepest amplifier level may include 50 MHz and some or all of the remaining amplifier levels may include additional bandwidth.

In a hybrid system, by not using the highest frequencies in a downstream manner deep in the amplifier cascade, makes such frequencies available for use in an upstream direction for at least one or more amplifier levels. At a point in the amplifier cascade, the upstream data may be frequency converted from a higher frequency to a lower frequency (such as insertion into a 200 MHz lower upstream band). In this manner, the same band of frequencies may be used for either the upstream or the downstream directions, based upon the particular levels in the amplifier level.

In general, bandwidth usage continues to grow year-on-year, a trend primarily driven by consumer video consumption of Internet video services. To meet increasing bandwidth demands, along with constraints in the operations of the networks including physical space, power consumption, and cooling in head-end locations, a distributed access architecture (DAA) has been developed.

The distributed access architecture (DAA) enables the evolution of cable networks by decentralizing and virtualizing headend and network functions. DAA extends the digital portion of the head-end or hub domain out to the fiber optic node and places the digital to RF interface at the optical-coax boundary in the node. Replacing the analog optics from the head-end converts the fiber link to a digital fiber link, increasing the available bandwidth improving fiber efficiencies (e.g., wavelengths and distance).

The distributed access architecture (DAA) replaces analog fiber connections with digital fiber connections to creates a software-defined network that typically supports, one or more of (1) node with remote PHY and/or remote MAC-PHY, (2) transition to digital optics removing analog lasers, (3) digital fiber closer to the subscriber's home, (4) migration to centralized data centers, and (5) flexible advertising, channel lineups, and bandwidth management.

Figure 23:
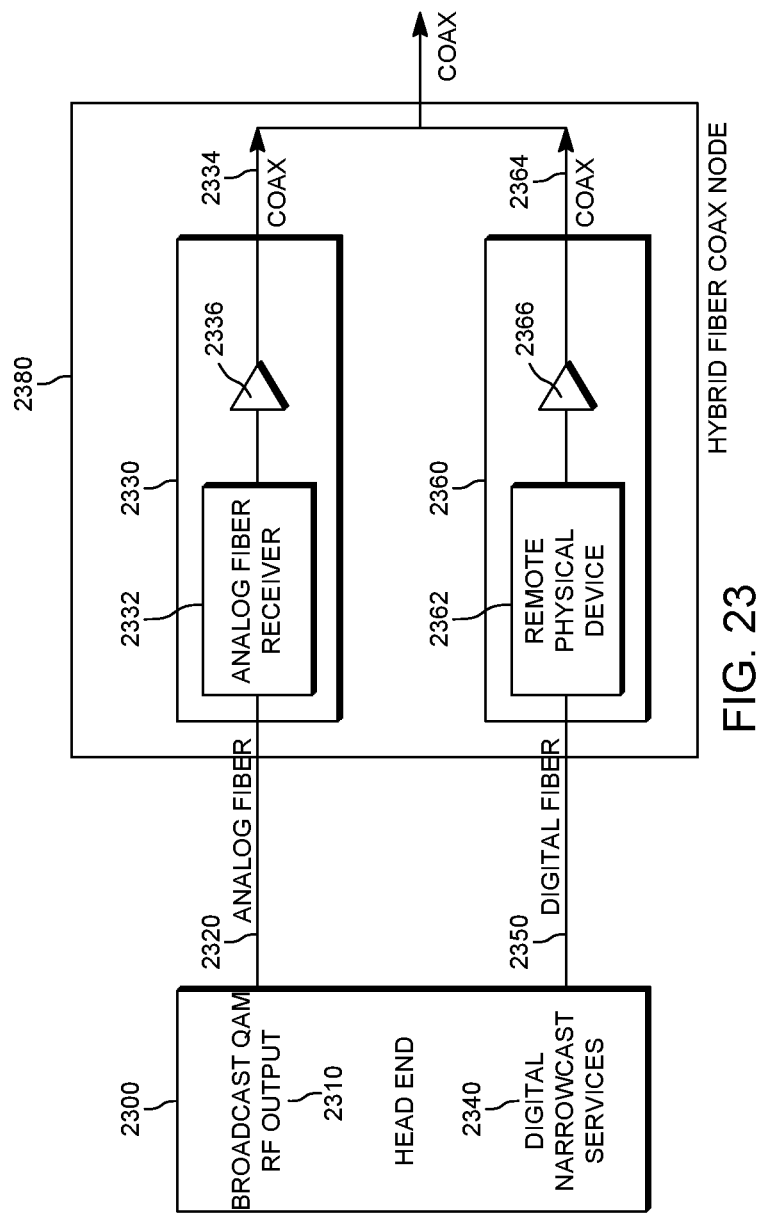
FIG. 23 illustrates an exemplary distributed access architecture.

Referring to FIG. 23, an exemplary distributed access architecture includes a head end 2300 that provides broadcast RF optically modulated signals 2310 downstream on an analog fiber 2320 that is typically between 108 MHz and an upper limit of 642 MHz or 750 MHz or more. Typically, the broadcast RF optically modulated signals 2310 use a QAM modulation. The broadcast RF optically modulated signals 2310 are received by a hybrid-fiber coax node 2380 and a hybrid-fiber coax module 2330. The hybrid-fiber coax module 2330 receives the broadcast RF optically modulated signals 2310 by a fiber receiver 2332 and provides broadcast RF modulated signals 2334 from a broadcast RF amplifier 2336. The broadcast RF modulated signals 2334 are combined with the narrowcast signals and provided on coaxial cables to one or more service groups. Also, a RF coaxial signal to RF fiber signal converter together with a reverse transmitter may be included to provide upstream signals. Preferably, the hybrid-fiber coax module 2330 is a digital forward receiver or the like.

The distributed access architecture includes the head end 2300 that provides one or more digitally encoded narrowcast RF signals or narrowcast data optically modulated as binary bitstreams 2340 downstream on a digital fiber 2350 with RF signal frequency range that is typically between 108 MHz and an upper limit of 642 MHz or 750 MHz or more. Typically, the digital narrowcast optically modulated signals 2340 use a digital modulation. The digital narrowcast RF optically modulated signals 2340 are received by the hybrid-fiber coax node 2380 and a remote module 2360. The remote module 2360 receives the digital narrowcast optically modulated signals 2340 by a remote physical device 2362. The remote physical device 2362 provides additional processing to the signals and provides narrowcast RF modulated signals 2364 from a narrowcast RF amplifier 2366. The narrowcast RF modulated signals 2364 are provided on coaxial cables to one or more service groups. The remote physical device 2362 may include lower PHY layer processing, if desired. The remote physical device 2362 may include lower PHY layer processing and upper PHY layer processing, if desired. The remote physical device 2362 (e.g., remote MAC/PHY) may include lower PHY layer processing, upper PHY layer processing, and MAC layer processing, if desired. The remote physical device 2362 (e.g., remote MAC/PHY) may include lower PHY layer processing, upper PHY layer processing, MAC layer processing, and M-CCAP packet shelf processing, if desired. Typically, the head end 2300 provides multiple digital narrowcast RF optically modulated signals downstream on respective digital fibers to other remote nodes for other service group(s).

In the vast majority of situations, the hybrid-fiber coax module 2330 and the remote module 2360 are maintained within the same node, with the hybrid-fiber coax module 2330 receiving analog signals and the remote module 2360 receiving digital signals.

Figure 24:
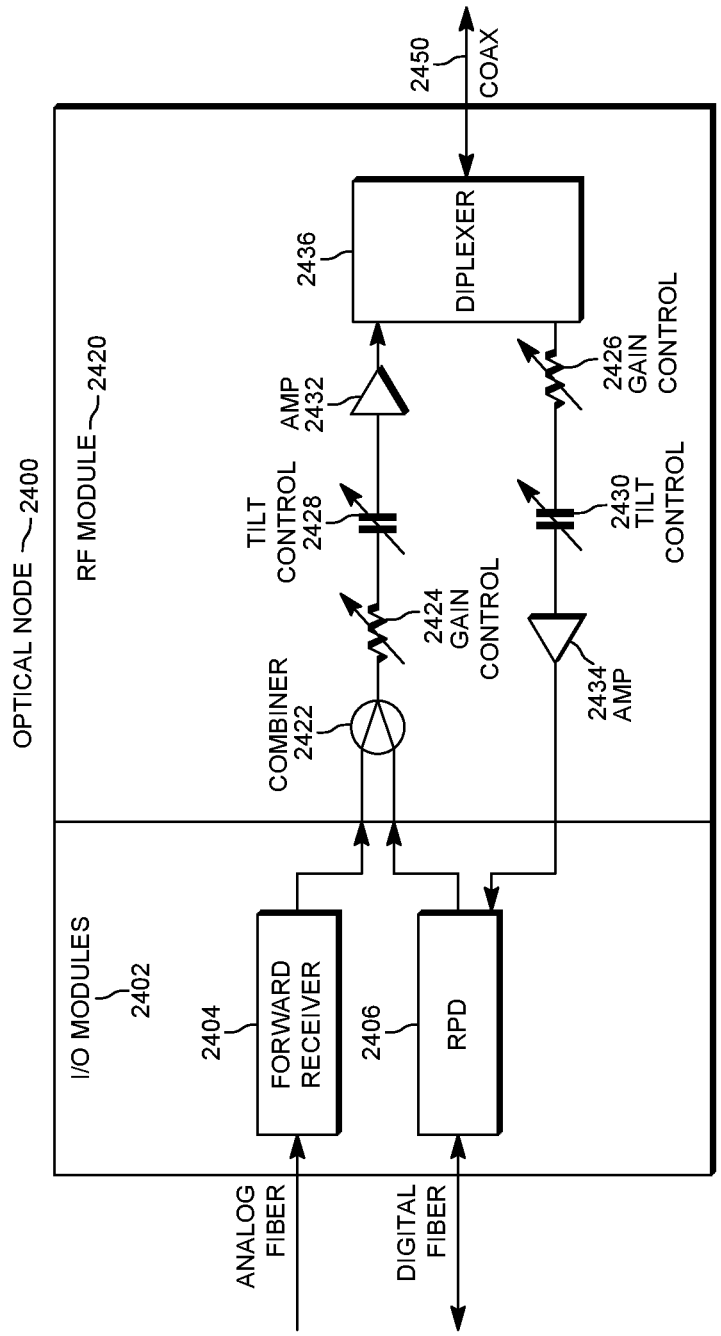
FIG. 24 illustrates an exemplary logical view of the combination of a hybrid-fiber coax node and a remote node.

Referring to FIG. 24, an exemplary logical view of the combination of the hybrid-fiber coax module 2330 and the remote module 2360, generally referred to as an optical node 2400, is illustrated. The optical node 2400 includes I/O modules 2402 that include a forward receiver 2404 (see analog fiber receiver 2332), and a remote physical device 2406 (see remote physical device 2362). A RF module 2420 may include transmitting and receiving components, such as a combiner 2422, gain controls 2424, 2426, tilt controls 2428 2430, amplifiers 2432, 2434 and a diplexer 2436. The diplexer 2436 may interconnect a coax 2450 to one or more service groups. It is noted that the narrowcast portions may include the broadcast portions therein.

As previously discussed, the broadcast output signals of the head end are analog signals, normally broadcast RF optically modulated signals. Moreover, it is desirable to maintain the head end without customized modifications for a particular network, as previously described. Accordingly, the broadcast RF optically modulated signals are provided in a traditional manner, without customization of the particular head end for the particular broadcast RF optically modulated signals.

Figure 25A:
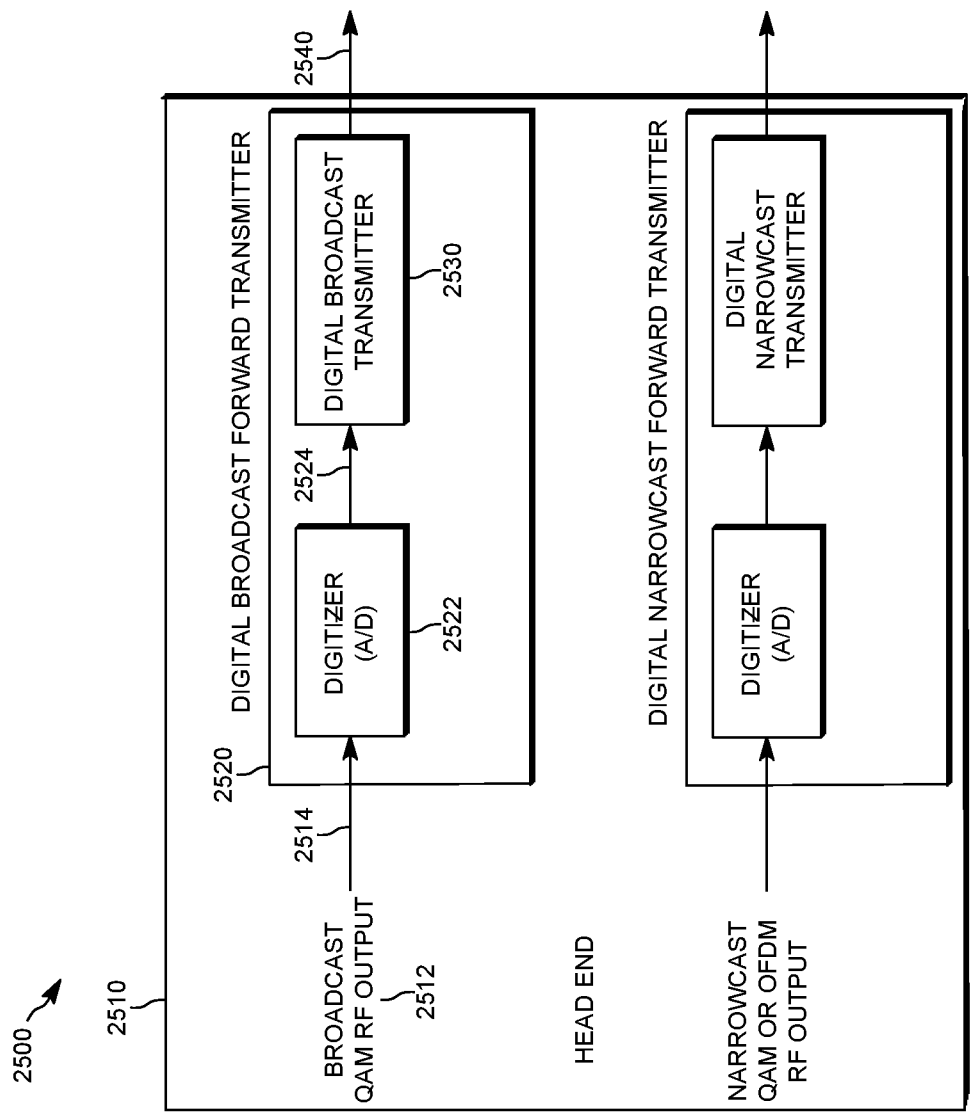
FIGS. 25A and 25B illustrate exemplary digital broadcast forward transmission platform.
Figure 25B:
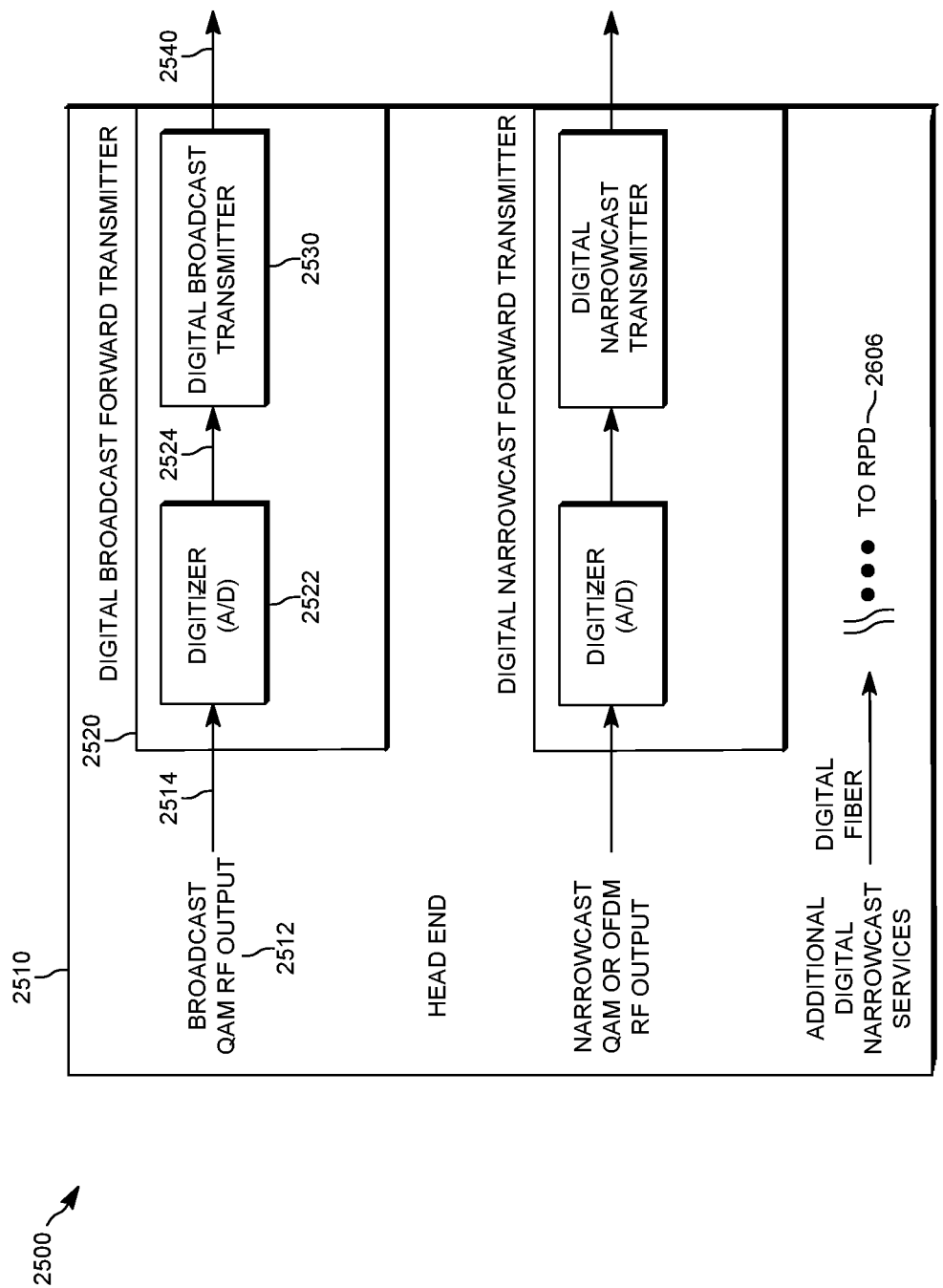

Referring to FIG. 25A, a modified system 2500 may include a head end 2510 that provides broadcast QAM RF output modulated signals 2512 on a connection 2514 that is typically between 108 MHz and an upper limit of 642 MHz or 750 MHz or more. A digital broadcast forward transmitter 2520 receives the broadcast QAM RF output modulated signals 2512 transmitted downstream on the connection 2514. A digitizer 2522 (e.g., analog-to-digital) digitizes the broadcast QAM RF output modulated signals 2512 destined for a digital broadcast transmitter. The analog to digital converter is akin to a 'brute force' digitizer that receives the analog input, and without attempting to characterize the information contained within the analog input, digitizes the analog input into a digital stream 2524. The digital broadcast transmitter 2530 receives the digital stream 2524 and provides a resulting signal 2540 that is transmitted to the designated fiber node along a fiber in a digital format. As a general matter, the fiber may carry approximately 10 Gbps or more. In a similar manner, a narrowcast QAM or OFDM RF output is provided to a digital narrowcast forward transmitter, which includes a similar digitizer (A/D) and a digital narrowcast transmitter to provide a resulting signal transmitted to the designated fiber node along a fiber in a digital format. The broadcast QAM RF output modulated signals may be at a first frequency range (e.g., 108 MHz to 642 MHz) and the narrowcast QAM or OFDM RF output modulated signals may be at a second frequency range (e.g., 642 MHz to 1218 MHz). Referring to FIG. 25B, in a similar manner in another embodiment, additional digital narrowcast services may be provided to a remote physical device (R-PHY). The additional digital narrowcast services may be at a third frequency range (e.g., 1218 MHz to 1794 MHz).

Figure 26:
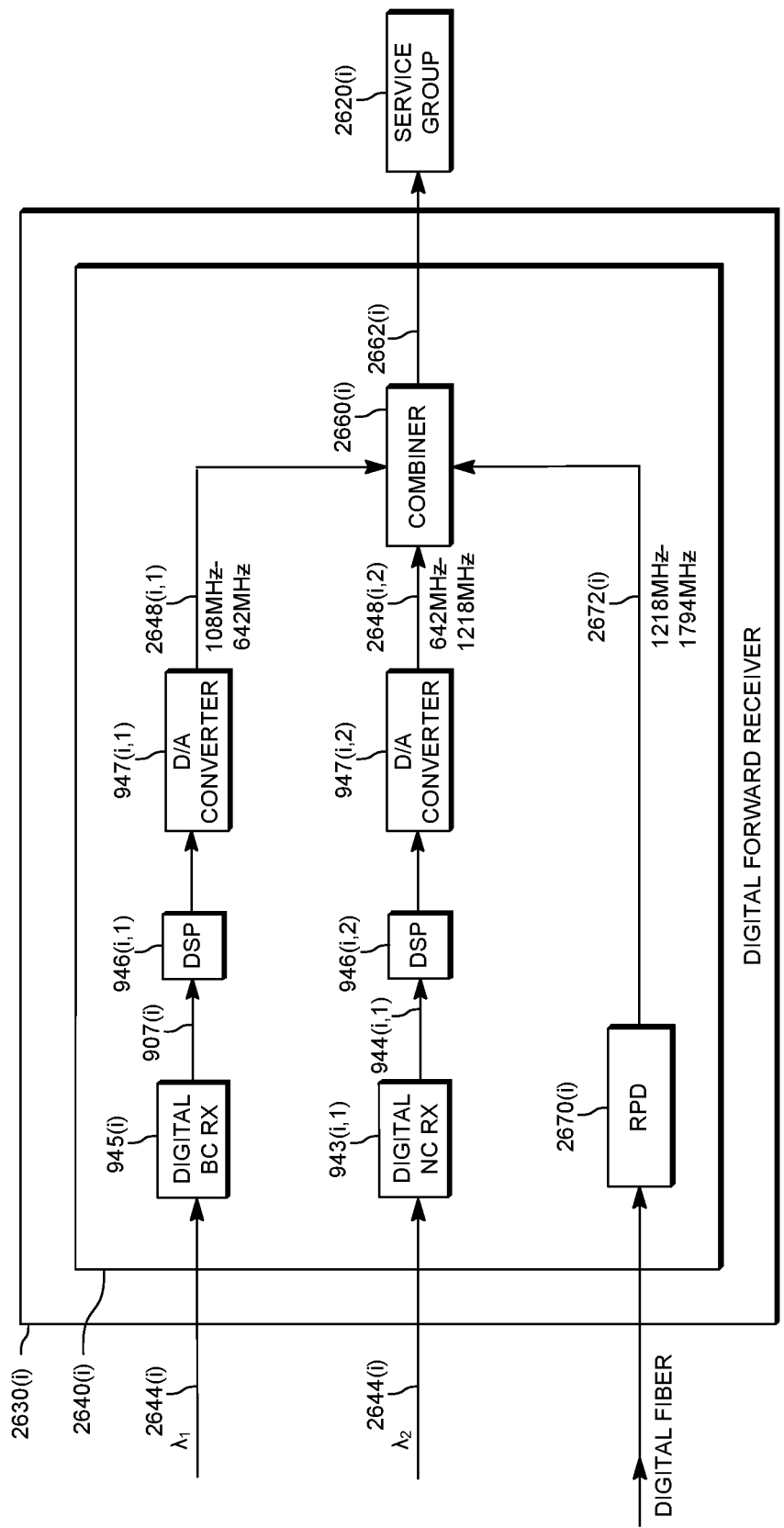
FIG. 26 illustrates an exemplary optical node for the digital broadcast forward transmission platform.

Referring to FIG. 26, the respective fiber nodes 2630($i$) include a digital forward receiver ("DFR") 2640($i$) to receive the respective resulting signals from the modified system 2500($i$) (see FIG. 25A and FIG. 25B). The digital forward receiver ("DFR") 2640($i$) receives the respective resulting broadcast and narrowcast resulting signals as a set of wavelengths 2644($i$) $\lambda_1 \ldots \lambda_n$. For example, $\lambda_1$ may correspond to the output of the digital broadcast transmitter. For example, $\lambda_2$ may correspond to the output of the digital narrowcast transmitter.

The associated set of set of wavelengths 2644($i$) $\lambda_1 \ldots \lambda_n$ (i.e., wavelengths) are received by a digital optical broadcast receiver 945($i$) that extracts the broadcast RF-modulated electrical signal 907($i$). A digital optical narrowcast receiver 943($i$,1) extracts the narrowcast RF-modulated electrical signal 944($i$,1). The electrical signals 907($i$) and 944($i$,1) are received by an associated DSP (digital signal processor 946($i$,1)($i$,2) and then processed by an associated D/A (digital-to-analog) converter 2646($i$,1)($i$,2). The associated D/A converter 2646($i$,1)($i$,2) may include any suitable filtering, as desired. The respective outputs of the D/A converters 2646 ($i$,1)($i$,2) includes a set of analog signals 2648 ($i$,1)($i$,2) that are preferably consistent with the initial frequency ranges provided by the headend. For example, analog signal 2648($i$,1) may be a broadcast signal between 108 MHz and 642 MHz which corresponds with broadcast QAM RF output. For example, analog signal 2648($i$,2) may be a narrowcast signal between 642 MHz and 1218 MHz which corresponds with the narrowcast QAM or ODFM RF output 840. As it may be observed, analog signals 2648 ($i$,1)($i$,2) preferably do not have overlapping frequency ranges, such as in a manner similar to the output of the headend. In general, the signal signals may be received and modified, as desired.

The digital forward receiver ("DFR") 2640($i$) may receive the additional digital narrowcast services by a remote physical device 2670($i$) that provides a set of frequencies 2672($i$) that are not overlapping with analog signal 2648($i$,1) and 2648($i$,2). For example, $\lambda_3$ may correspond to the input of the RPD 2670($i$). For example, RPD analog output signal 2672($i$) may be a signal between 1218 MHz and 1794 MHz which corresponds with the additional digital narrowcast services.

A combiner 2660($i$) may combine the analog signals 2648 ($i$,1)($i$,2) and analog signal 2672($i$). In this manner, a set of signals may be combined that includes analog signals that are non-overlapping with one another. A frequency up-converter (or down-converter) may be used, if there are overlapping frequencies. A resulting signal 2662($i$) from the combiner 2660($i$) may, for example, be transmitted to the associated service group 2620($i$) and/or customer premise device within the same service group 2620($i$). The resulting signal 2662($i$) is preferably an analog signal suitable for being transmitted down a co-axial cable, such as using a QAM or OFDM modulation. The customer premise device within a service group 2620($i$) may down convert one or more of the received signals, such as the analog signal 2672($i$), for subsequent processing and usage.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An amplification system for amplifying a service of a cable television network, the amplification system comprising:
   (a) a first amplifier receiving said service and providing a first output signal having a first frequency band with a first maximum downstream frequency to a first customer and a second amplifier;
   (b) said second amplifier receiving said first output signal and providing a second output signal having a second frequency band with a second maximum downstream frequency to a second customer, wherein said second maximum downstream frequency is less than said first maximum downstream frequency;
(c) wherein said first frequency band is greater than said second frequency band.

2. The amplification system of claim 1 wherein said first amplifier providing said first output signal having said first frequency band with said first maximum downstream frequency to a first additional plurality of customers.

3. The amplification system of claim 2 wherein said second amplifier providing said second output signal having said second frequency band with said second maximum downstream frequency to a second additional plurality of customers.

4. The amplification system of claim 1 wherein a lowest frequency of said first frequency band is the same as a lowest frequency of said second frequency band.

5. The amplification system of claim 4 wherein said first maximum downstream frequency is greater than 1000 MHz and said second maximum downstream frequency is less than 1000 MHz.

6. The amplification system of claim 4 wherein said first maximum downstream frequency is greater than or equal to 1200 MHz and said second maximum downstream frequency is less than or equal to 1200 MHz.

7. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) wherein said second maximum downstream frequency is determined as a result of a filter in said second amplifier.

8. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) wherein a first maximum signal power level is determined as a result of a filter in said second amplifier.

9. The amplification system of claim 8 wherein said filter is a cut-off filter.

10. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) wherein said first amplifier and said second amplifier are capable of providing a same maximum signal power level.

11. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) wherein said first output signal of said first amplifier accounts for cable tilt.

12. The amplification system of claim 11 wherein said second output signal of said second amplifier accounts for cable tilt.

13. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) a second upstream signal received by said second amplifier from said second customer.

14. The amplification system of claim 13 wherein said second upstream signal has a second upstream frequency band that is non-overlapping with said second downstream frequency band.

15. The amplification system of claim 14 wherein said second upstream signal is provided by said second amplifier as a first upstream signal to said first amplifier.

16. The amplification system of claim 15 wherein first upstream signal has a first upstream frequency band that is greater than said second upstream frequency band.

17. The amplification system of claim 16 wherein said second upstream frequency band is overlapping in frequency with said second downstream frequency band.

18. An amplification system for amplifying a service of a cable television network, the amplification system comprising:
(a) a first amplifier receiving said service and providing a first output signal having a first frequency band with a first maximum downstream frequency to a first customer and a second amplifier;
(b) said second amplifier receiving said first output signal and providing a second output signal having a second frequency band with a second maximum downstream frequency to a second customer, wherein said second maximum downstream frequency is less than said first maximum downstream frequency;
(c) wherein a first maximum signal power level of the first output signal to said first customer is greater than a second maximum power signal level of the second signal to said second customer.

* * * * *